(12) United States Patent
Liu et al.

(10) Patent No.: US 11,343,814 B2
(45) Date of Patent: May 24, 2022

(54) SLOT SCHEDULING METHOD AND APPARATUS

(71) Applicant: Huawei Technologies Co., Ltd., Shenzhen (CN)

(72) Inventors: Yun Liu, Shenzhen (CN); Jian Wang, Beijing (CN); Da Wang, Beijing (CN); Yongbo Zeng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/347,419

(22) PCT Filed: Dec. 13, 2016

(86) PCT No.: PCT/CN2016/109722
§ 371 (c)(1),
(2) Date: May 3, 2019

(87) PCT Pub. No.: WO2018/082157
PCT Pub. Date: May 11, 2018

(65) Prior Publication Data
US 2019/0313406 A1 Oct. 10, 2019

(30) Foreign Application Priority Data
Nov. 4, 2016 (CN) .......................... 201610966024.1

(51) Int. Cl.
*H04W 72/04* (2009.01)
*H04L 5/00* (2006.01)
(Continued)

(52) U.S. Cl.
CPC ....... *H04W 72/0446* (2013.01); *H04L 5/0007* (2013.01); *H04L 27/2666* (2013.01); *H04W 72/04* (2013.01); *H04W 72/1268* (2013.01)

(58) Field of Classification Search
CPC .. H04L 24/2666; H04L 5/0007; H04W 72/04; H04W 72/0446; H04W 72/1268
See application file for complete search history.

(56) References Cited

U.S. PATENT DOCUMENTS 10,038,581 B2 * 7/2018 Zhang .................. H04L 5/0007
2007/0177494 A1 * 8/2007 Tomizawa .............. H04L 5/023
370/208
(Continued)

FOREIGN PATENT DOCUMENTS

CN 102457367 A 5/2012
CN 105580426 A 5/2016
(Continued)

OTHER PUBLICATIONS

3GPP TSG-RAN WG1 Meeting #86bis, R1-1609236, Oct. 1, 2016 See Section 2 (Year: 2016).*
(Continued)

*Primary Examiner* — Mansour Oveissi
(74) *Attorney, Agent, or Firm* — Slater Matsil, LLP

(57) ABSTRACT

A slot scheduling method and apparatus are provided. A determined slot includes a first slot, the first slot includes a first idle time, and a time interval between a start moment of the first idle time and a start moment of the first slot is less than or equal to a preset time interval threshold, or a time interval between a start moment of the first idle time and an end moment of at least one OFDM symbol that is in the first slot and that is used to transmit control signaling is less than or equal to a preset time interval threshold. No first service is scheduled in the first idle time, thereby providing a transmission opportunity for a second service. In addition, time-domain locations of uplink transmission and downlink transmission of the first service and the second service do not overlap.

23 Claims, 13 Drawing Sheets

(51) Int. Cl.
*H04L 27/26* (2006.01)
*H04W 72/12* (2009.01)

(56) References Cited

U.S. PATENT DOCUMENTS

| | | | |
|---|---|---|---|
| 2015/0092703 | A1 | 4/2015 | Xu et al. |
| 2015/0201445 | A1 | 7/2015 | Lee et al. |
| 2016/0020891 | A1* | 1/2016 | Jung ................ H04W 72/1278 370/280 |
| 2016/0119948 | A1 | 4/2016 | Damnjanovic et al. |
| 2018/0206253 | A1* | 7/2018 | Yun ...................... H04L 5/0062 |
| 2019/0288809 | A1 | 9/2019 | Iyer et al. |

FOREIGN PATENT DOCUMENTS

| | | |
|---|---|---|
| CN | 105763290 A | 7/2016 |
| CN | 105763305 A | 7/2016 |
| JP | 2019524030 A | 8/2019 |

OTHER PUBLICATIONS

3GPP TSG-RAN WG1 Meeting #86bis, R1-1609886, Sep. 30, 2016 See Section 2 (Year: 2016).*
3GPP TSG-RAN WG1 Meeting #86, R1-167269, Aug. 12, 2016 See Section 2, Section 3 (Year: 2016).*
3GPP TSG-RAN WG1 Meeting #86bis, R1-1610177, Oct. 1, 2016 (Year: 2016).*
LG Electronics, "Handling URLLC in new RAT", 3GPP TSG RAN WG1 Meeting #86, R1-166886, Gothenburg, Sweden, Aug. 22-26, 2016, 6 pages.
LG Electronics, "On multiplexing between eMBB and URLLC", 3GPP TSG RAN WG1 Meeting #86bis, R1-1609236, Lisbon, Portugal, Oct. 10-14, 2016, 12 pages.
Nokia et al., "On the URLLC transmission formats for NR TDD", 3GPP TSG-RAN WG1#86, R1-167269, Gothenburg, Sweden, Aug. 22-26, 2016, 8 pages.
LG Electronics, "Discussion on flexible duplex operations in NR design", 3GPP TSG RAN WG1 Meeting #86bis, R1-1610415, Lisbon, Portugal, Oct. 10-14, 2016, 8 pages.
NTT Docomo, Inc.,"On co-existence of eMBB and URLLC", 3GPP TSG RAN WG1 Meeting #86, R1-167391, Gothenburg, Sweden Aug. 22-26, 2016, total 5 pages.
Catt, "Nr Ul Control Channel Design Considerations," 3GPP TSG AN WG1 Meeting #86bis, R1-1608792, Lisbon, Portugal Oct. 10-14, 2016, 3 pages.
Qualcomm Incorporated, "DL control channels overview," 3GPP TSG-RAN WG1 #86bis, R1-1610177, Lisbon, Portugal, Oct. 10-14, 2016, 6 pages.
Huawei et al., "Overview of URLLC support in NR",3GPP TSG RAN WG1 Meeting #86bis, R1-1608843, Lisbon, Portugal, Oct. 10-14, 2016, 7 pages.
Huawei et al., "Discussion on frame structure for NR," 3GPP TSG RAN WG1 Meeting #85, R1-164032, Nanjing, China, May 23-27, 2016, 8 pages.
Huawei et al, "Support of URLLC in UL," 3GPP TSG RAN WG1 Meeting #86bis, R1-1610737, Lisbon, Portugal, Oct. 10-14, 2016, 9 pages.
Mediatek Inc., Discussion on slot structure and channel format, 3GPP TSG RAN WG1 Meeting #86bis, R1-1609555, Lisbon, Portugal, Oct. 10-14, 2016, 6 pages.
Panasonic, "Discussion on the multiplexing of different numerologies", 3GPP TSG-RAN WG1 Meeting 85, R1-164985, Nanjing, China, May 23-27, 2016, 5 pages.
Nokia, et al.,"Comparison of slot and mini-slot based approaches for URLLC", 3GPP TSG-RAN WG1 #86 Bis, R1-1609664, Lisbon, Portugal, Oct. 10-14, 2016, 8 pages.

* cited by examiner

SLOT SCHEDULING METHOD AND APPARATUS

CROSS-REFERENCE TO RELATED APPLICATIONS

This application is a National Stage of International Application No. PCT/CN2016/109722, filed on Dec. 13, 2016, which claims priority to Chinese Patent Application No. 201610966024.1, filed on Nov. 4, 2016, both of which are hereby incorporated by reference in their entireties.

TECHNICAL FIELD

The present invention relates to the field of communications technologies, and in particular, to a slot scheduling method and apparatus.

BACKGROUND

With evolution of communications systems, a 5th Generation (5G) new radio (New Radio, NR) communications system is under research.

In 5G NR, a plurality of services, such as an enhanced mobile broadband (enhanced mobile broadband, eMBB) service and an ultra-reliable and low-latency communications (ultra-reliable and low-latency communications, URLLC) service, are supported. eMBB is an enhancement of an existing mobile broadband service, and supports more high-bandwidth services, for example, services such as 4k video transmission and virtual reality (Virtual Reality, VR) game rendering. The ultra-reliable and low-latency communications service supports a correct demodulation rate to 99.999% in terms of extremely high reliability, and supports an end-to-end time delay within 0.5 ms in terms of extremely low latency. Major URLLC application scenarios include applications such as a self-driving car and a networking drone that have high requirements for reliability and latency.

It can be learned from descriptions of the foregoing two services that different services have different latency and bandwidth requirements. Correspondingly, carrier spacings may also be different. A numerology means a transmission type, including parameters such as a subcarrier spacing and symbol duration. When a network device or a terminal uses a particular numerology, transmission is performed by using a subcarrier spacing in the numerology. The network device or the terminal may use a plurality of numerologies, such as numerologies that include different subcarrier spacings of 15 kHz, 30 kHz, and 60 kHz, and perform transmission in adjacent frequency bands in frequency domain (adjacent-frequency mode transmission), as shown in FIG. 1. Alternatively, the network device or the terminal may use a plurality of numerologies to perform transmission in a same frequency band (intra-frequency mode transmission), as shown in FIG. 2.

Currently, regardless of using an adjacent-frequency mode or an intra-frequency mode, interference between uplink data transmission and downlink data transmission may occur. For example, during intra-frequency mode transmission, in a downlink-dominate slot including 14 symbols, downlink data transmission in each 1-ms subframe may continue for 0.8 ms or more. If a frequency band is occupied by downlink data transmission for a long time, an end-to-end time delay of 0.5 ms cannot be implemented in URLLC uplink data transmission in the same frequency band. Likewise, in an uplink-dominate subframe, if a frequency band is occupied by uplink data transmission for a long time, an end-to-end time delay of 0.5 ms cannot be implemented in URLLC downlink transmission in the same frequency band. For another example, during adjacent-frequency mode transmission, when one network device supports different services in two adjacent frequency bands, if one frequency band supports eMBB service downlink transmission that continues for 0.8 ms, the other frequency band cannot support a URLLC uplink transmission service due to interference caused by adjacent frequency leakage of adjacent frequency bands. Consequently, a high-reliability requirement cannot be met. Likewise, if eMBB uplink transmission is performed in one frequency band and URLLC downlink transmission is used in the other frequency band, the eMBB uplink transmission is also affected due to adjacent frequency leakage. When different network devices support the eMBB and URLLC services respectively and two network devices work in adjacent frequencies, interference between uplink data transmission and downlink data transmission still exists.

SUMMARY

Embodiments of the present invention provide a slot scheduling method and apparatus, to avoid interference between uplink data transmission and downlink data transmission.

According to a first aspect, a slot scheduling method is provided. In the method, an eNB determines and sends a slot, and UE receives the slot sent by the eNB, and transmits data based on a slot structure. The slot determined by the eNB includes a first slot, the first slot includes a first idle time, and a time interval between a start moment of the first idle time and a start moment of the first slot is less than or equal to a preset time interval threshold, or a time interval between a start moment of the first idle time and an end moment of at least one OFDM symbol that is in the first slot and that is used to transmit control signaling is less than or equal to a preset time interval threshold. The preset time interval threshold may be determined based on a requirement of a minimum latency required for a service to be actually transmitted. Usually, the preset time interval threshold is less than or equal to 1 millisecond. For example, if the first idle time is used to transmit uplink data or downlink data for a URLLC service, the preset time interval threshold may be 0.5 millisecond.

In the embodiments of the present invention, when a slot is scheduled, a transmission time and an idle time are set in the slot, and the transmission time and the idle time are respectively used to transmit different services in an intra-frequency mode or an adjacent-frequency mode, to avoid interference between different services in the intra-frequency mode or the adjacent-frequency mode.

In a possible implementation, the slot further includes a second slot, where the second slot includes a second idle time. A time interval between a start moment of the second idle time and a start moment of the second slot is less than or equal to a preset time interval threshold, or a time interval between a start moment of the second idle time and an end moment of at least one OFDM symbol that is in the second slot and that is used to transmit control signaling is less than or equal to a preset time interval threshold. A time interval between the start moment of the second idle time and the start moment of the first idle time is less than or equal to a preset time interval threshold, or a time interval between the start moment of the second idle time and an end moment of the first idle time is less than or equal to a preset time interval threshold, or a time interval between an end moment of the second idle time and the start moment of the first idle time is less than or equal to a preset time interval threshold, or a time interval between an end moment of the second idle time and an end moment of the first idle time is less than or equal to a preset time interval threshold.

The first slot includes seven OFDM symbols, and an $N^{th}$ OFDM symbol in the first slot is an OFDM symbol that is in the seven OFDM symbols and that is used to transmit uplink data, and an $(N-1)^{th}$ or $(N-2)^{th}$ OFDM symbol belongs to the first idle time or the second idle time.

The first slot includes seven OFDM symbols, and an $N^{th}$ OFDM symbol in the first slot is an OFDM symbol that is in the seven OFDM symbols and that is used to transmit downlink data, and an $(N+1)^{th}$ or $(N+2)^{th}$ OFDM symbol belongs to the first idle time or the second idle time.

In another possible implementation, the first slot includes a first transmission time, a first idle time, a second idle time, and a second transmission time.

A time interval between a start moment of the second idle time and a start moment of the second transmission time is less than or equal to a preset time interval threshold, or a time interval between a start moment of the second idle time and an end moment of the second transmission time is less than or equal to a preset time interval threshold.

A time interval between the start moment of the second idle time and the start moment of the first idle time is less than or equal to a preset time interval threshold, or a time interval between the start moment of the second idle time and an end moment of the first idle time is less than or equal to a preset time interval threshold, or a time interval between an end moment of the second idle time and the start moment of the first idle time is less than or equal to a preset time interval threshold, or a time interval between an end moment of the second idle time and an end moment of the first idle time is less than or equal to a preset time interval threshold.

The first slot includes 14 OFDM symbols, and an $N^{th}$ OFDM symbol in the first slot is one of first to sixth OFDM symbols in the first slot. The first idle time includes at least one of the $N^{th}$ OFDM symbol, an $(N+1)^{th}$ OFDM symbol, an $(N+7)^{th}$ OFDM symbol, and an $(N+8)^{th}$ OFDM symbol that are in the slot.

The first slot includes 14 OFDM symbols, and an $N^{th}$ OFDM symbol in the first slot is an OFDM symbol that is in the 14 OFDM symbols and that is used to transmit uplink data, and at least one of an $(N-2)^{th}$ OFDM symbol, an $(N-1)^{th}$ OFDM symbol, an $(N-8)^{th}$ OFDM symbol, and an $(N-7)^{th}$ OFDM symbol that are in the first slot belongs to the first idle time or the second idle time.

The first slot includes 14 OFDM symbols, and an $N^{th}$ OFDM symbol in the first slot is an OFDM symbol that is in the 14 OFDM symbols and that is used to transmit downlink data, and at least one of an $(N+1)^{th}$ OFDM symbol, an $(N+2)^{th}$ OFDM symbol, an $(N+7)^{th}$ OFDM symbol, and an $(N+8)^{th}$ OFDM symbol that are in the first slot belongs to the first idle time or the second idle time.

In another possible implementation, the first slot and/or the second slot occupy/occupies at least two frequency bands in frequency domain, the at least two frequency bands include a first frequency band and a second frequency band, and the first idle time or the second idle time is in the first frequency band. A communication direction of data transmitted in another OFDM symbol that is in the first frequency band and that is other than the OFDM symbol included in the first idle time, the OFDM symbol included in the second idle time, and the $N^{th}$ OFDM symbol is opposite to a communication direction of data transmitted in the $N^{th}$ OFDM symbol, and the communication direction includes an uplink communication direction and a downlink communication direction. A communication direction of data transmitted in an OFDM symbol that is in the second frequency band and that corresponds to the first idle time and the second idle time in the first frequency band at a time-domain symbol location is the same as the communication direction of the data transmitted in the $N^{th}$ symbol. A communication direction of data transmitted in another OFDM symbol that is in the second frequency band and that is other than the OFDM symbol corresponding to the first idle time and the second idle time in the first frequency band at the time-domain symbol location is opposite to the communication direction of the data transmitted in the $N^{th}$ symbol.

In a possible implementation, the first slot includes a first transmission time and a first idle time. At least one of OFDM symbols included in the first transmission time is used to transmit a first service, and at least one of OFDM symbols included in the first idle time is used to transmit a second service.

When the eNB determines the OFDM symbol that is in the first transmission time and that is used to transmit the first service and the OFDM symbol that is in the first idle time and that is used to transmit the second service, to schedule the UE, in an implementation, the eNB may send indication information to the UE, where the indication information is used to indicate the at least one OFDM symbol that is in the first idle time and that is used to transmit the second service, and/or used to indicate at least one OFDM symbol that is in at least one first transmission time and that is used to transmit the first service. The indication information may be sent by using downlink control information (Downlink Control Information, DCI), radio resource control (Radio Resource Control, RRC) information, or the like. In another implementation, a predefined manner may also be used to define at least one OFDM symbol that is in the first idle time and that is used to transmit second service data.

In another possible implementation, when scheduling the first service, the eNB may cancel or not schedule transmission of first service data in the first idle time. Because the eNB cancels or does not schedule the transmission of the first service data, the UE does not transmit the first service data in the first idle time.

In a downlink-only slot, the first service is not performed in a sixth OFDM symbol or a thirteenth OFDM symbol. The OFDM symbol in which the first service is not performed is an OFDM symbol in the first idle time and the second idle time. In a downlink-dominate slot including seven OFDM symbols, if a number of an OFDM symbol at which uplink transmission of the first service starts is N, the first service is not performed in an $(N-2)^{th}$ or $(N-1)^{th}$ OFDM symbol. In a downlink-dominate slot including 14 OFDM symbols, if a number of an OFDM symbol at which uplink transmission of the first service starts is N, the first service is not performed in an $(N-2)^{th}$, $(N-1)^{th}$, $(N-8)^{th}$, or $(N-7)^{th}$ OFDM symbol.

In an uplink-only slot, the first service is not performed in a second OFDM symbol or a ninth OFDM symbol. In an uplink-dominate slot including seven OFDM symbols, if a number of an OFDM symbol at which downlink transmission of the first service ends is N, the first service is not performed in an $(N+1)^{th}$ or $(N+2)^{th}$ OFDM symbol. In an uplink-dominate slot including 14 OFDM symbols, if a number of an OFDM symbol at which downlink transmission of the first service ends is N, the first service is not performed in an $(N+1)^{th}$, $(N+2)^{th}$, $(N+7)^{th}$, or $(N+8)^{th}$ OFDM symbol.

In a downlink-only slot, the first service is not performed in a sixth or thirteenth OFDM symbol. In a downlink-dominate slot including 14 OFDM symbols, if a number of an OFDM symbol at which uplink transmission of the first service starts is N, the first service is not performed in an $(N-1)^{th}$ or $(N-8)^{th}$ OFDM symbol.

In an uplink-only slot, the first service is not performed in a first OFDM symbol or an eighth OFDM symbol. In an uplink-dominate slot including seven OFDM symbols, if a number of an OFDM symbol at which downlink transmission of the first service ends is N, the first service is not performed in an $(N+1)^{th}$ OFDM symbol. In an uplink-dominate slot including 14 OFDM symbols, if a number of an OFDM symbol at which downlink transmission of the first service ends is N, the first service is not performed in an $(N+1)^{th}$ or $(N+8)^{th}$ OFDM symbol.

In a downlink-only slot, the first service is not performed in a seventh or fourteenth OFDM symbol. In a downlink-dominate slot including 14 OFDM symbols, if a number of an OFDM symbol at which uplink transmission of the first service starts is N, the first service is not performed in an $(N-7)^{th}$ OFDM symbol.

In an uplink-only slot, the first service is not performed in a first OFDM symbol or an eighth OFDM symbol. In an uplink-dominate slot including 14 OFDM symbols, if a number of an OFDM symbol at which downlink transmission of the first service ends is N, the first service is not performed in an $(N+7)^{th}$ OFDM symbol.

In a downlink-only slot, the first service is not performed in a seventh or fourteenth OFDM symbol. In a downlink-dominate slot including 14 OFDM symbols, if a number of an OFDM symbol at which uplink transmission of the first service starts is N, the first service is not performed in an $(N-7)^{th}$ OFDM symbol.

In an uplink-only slot, the first service is not performed in a first OFDM symbol or an eighth OFDM symbol. In an uplink-dominate slot including 14 OFDM symbols, if a number of an OFDM symbol at which downlink transmission of the first service ends is N, the first service is not performed in an $(N+7)^{th}$ OFDM symbol.

In another possible implementation, if the first slot and/or the second slot include/includes idle OFDM symbols used for receive/transmit transition, at least two idle OFDM symbols used for receive/transmit transition may be set, to reserve enough time to implement transition between transmission of the first service and transmission of the second service.

According to a second aspect, a slot scheduling apparatus is provided. The slot scheduling apparatus has functions of implementing slot scheduling in the first aspect. The functions may be implemented by hardware, or may be implemented by hardware executing corresponding software. The hardware or the software includes one or more modules corresponding to the foregoing functions. The modules may be software and/or hardware.

In a possible design, the slot scheduling apparatus includes a processing unit and a communications unit, where functions of the processing unit and the communications unit may correspond to method steps. In addition, a slot determined by the processing unit has any slot structure in the first aspect. Details are not described herein again.

According to a third aspect, a network device is provided, where the network device includes a processor, a memory, a receiver, and a transmitter.

The memory is configured to store an instruction. The processor is configured to execute the instruction stored in the memory, to control the receiver and the transmitter to receive and send a signal. When the processor executes the instruction stored in the memory, the network device is configured to complete any slot scheduling method described in the first aspect.

In the embodiments of the present invention, an idle time is set at a specific location in a slot. No first service is scheduled in the idle time, thereby providing a transmission opportunity for a second service. In addition, time-domain locations of uplink transmission and downlink transmission of the first service and the second service do not overlap, thereby avoiding mutual interference.

DETAILED DESCRIPTION OF ILLUSTRATIVE EMBODIMENTS

Figure 1:
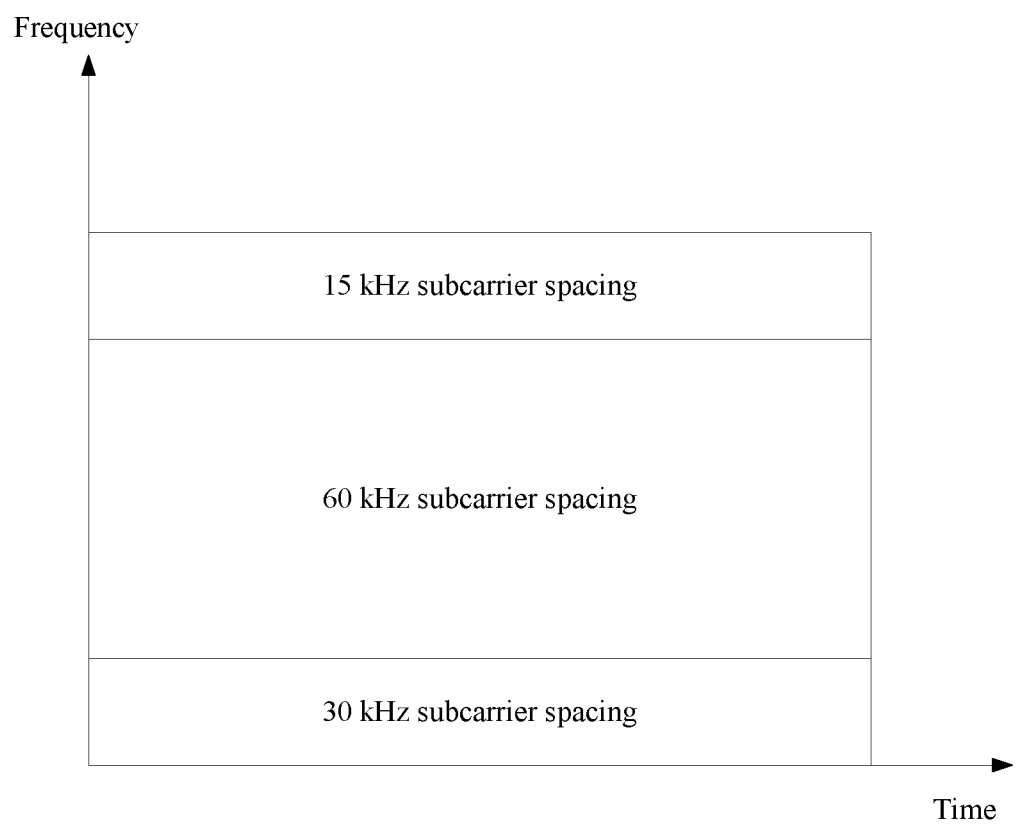
FIG. 1 is a schematic diagram of current adjacent-frequency mode transmission.
Figure 2:
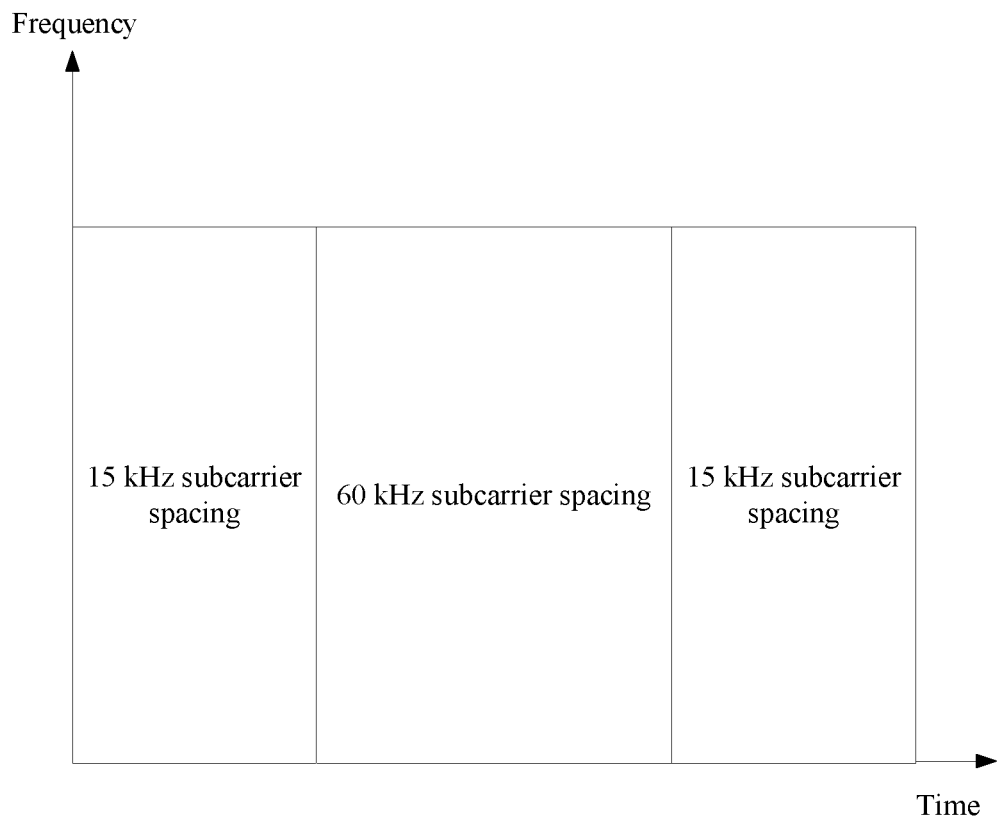
FIG. 2 is a schematic diagram of current intra-frequency mode transmission.

The following describes embodiments of the present invention with reference to the accompanying drawings.

First, some terms in this application are described to help a person skilled in the art have a better understanding.

(1) A network device, which may be referred to as a radio access network (Radio Access Network, RAN) device, is a device that connects a terminal and a wireless network, including but not limited to: an evolved NodeB (evolved NodeB, eNB), a radio network controller (Radio Network Controller, RNC), a NodeB (NodeB, NB), a base station controller (Base Station Controller, BSC), a base transceiver station (Base Transceiver Station, BTS), a home base station (for example, Home evolved NodeB or Home NodeB, HNB), a baseband unit (BaseBand Unit, BBU), a Wireless Fidelity (Wireless Fidelity, Wi-Fi) access point (Access Point, AP), a transmission point (transmission and receiver point, TRP or transmission point, TP), or the like.

(2) A terminal is a device that provides voice and/or data connectivity for a user, and may include a handheld device, an in-vehicle device, a wearable device, or a computing device that has a wireless communication function; another processing device connected to a wireless modem; or user equipment (User Equipment, UE) in various forms, including a mobile station (Mobile Station, MS), a terminal device (Terminal Equipment), a transmission point (transmission and receiver point, TRP or transmission point, TP), and the like.

(3) Interaction: Interaction in this application means a process in which two interaction parties transfer information to each other. The transferred information herein may be the same or different. For example, the two interaction parties are a base station 1 and a base station 2, the base station 1 may request information from the base station 2, and the base station 2 provides the base station 1 with the information requested by the base station 1. Certainly, the base station 1 and the base station 2 may request information from each other. The requested information herein may be the same or different.

(4) "A plurality of" refers to two or more than two. The term "and/or" describes an association relationship of associated objects and represents that three relationships may exist. For example, A and/or B may represent the following three cases: Only A exists, both A and B exist, and only B exists. The character "/" generally represents an "or" relationship between the associated objects.

(5) The terms "network" and "system" are often used interchangeably, but a person skilled in the art can understand meanings of the terms. "Information (information)", "signal (signal)", "message (message)", and "channel (channel)" may be used interchangeably. It should be noted that, when distinctions are not emphasized, meanings to be expressed are consistent. Herein, "of (of)", "corresponding (corresponding, relevant)", and "corresponding (corresponding)" may be used interchangeably sometimes. It should be noted that, when distinctions are not emphasized, meanings to be expressed are consistent.

Figure 3:
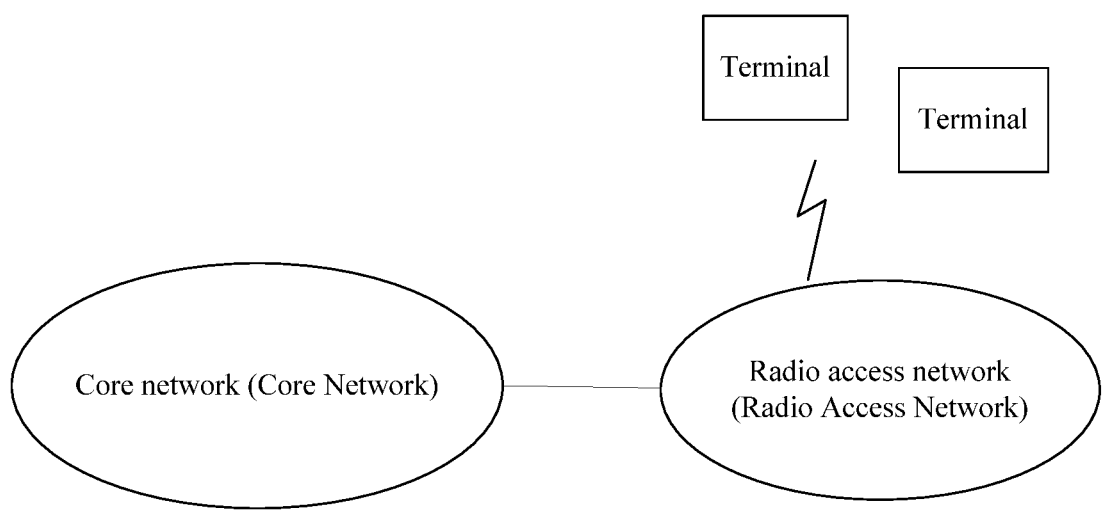
FIG. 3 is an architectural diagram of a wireless communications system to which a slot scheduling method is applied according to an embodiment of the present invention.

A slot scheduling method provided in the embodiments of the present invention may be applied to a wireless communications system shown in FIG. 3. As shown in FIG. 3, a terminal accesses a core network (Core Network, CN) by using a radio access network (Radio Access Network, RAN), and performs various communication services.

It can be understood that the wireless communications system is a network that provides a wireless communication function. The wireless communications system may use different communications technologies, for example, Code Division Multiple Access (code division multiple access, CDMA), Wideband Code Division Multiple Access (wideband code division multiple access, WCDMA), Time Division Multiple Access (time division multiple access, TDMA), Frequency Division Multiple Access (frequency division multiple access, FDMA), orthogonal frequency division multiple access (orthogonal frequency division multiple access, OFDMA), single carrier frequency division multiple access (single Carrier FDMA, SC-FDMA), and carrier sense multiple access with collision avoidance (Carrier Sense Multiple Access with Collision Avoidance). Based on factors such as capacities, rates, and latencies of different networks, the networks may be classified into a 2G (English: generation) network, a 3G network, a 4G network, or a future evolved network, such as a 5G network. A typical 2G network includes a Global System for Mobile Communications (global system for mobile communications/general packet radio service, GSM) network or a general packet radio service (general packet radio service, GPRS) network. A typical 3G network includes a Universal Mobile Telecommunications System (universal mobile telecommunications system, UMTS) network. A typical 4G network includes a Long Term Evolution (long term evolution, LTE) network. The UMTS network may sometimes be referred to as a universal terrestrial radio access network (universal terrestrial radio access network, UTRAN), and the LTE network may sometimes be referred to as an evolved universal terrestrial radio access network (evolved universal terrestrial radio access network, E-UTRAN). Based on different resource allocation modes, the networks may be classified into a cellular communications network and a wireless local area network (wireless local area network, WLAN). The cellular communications network is scheduling-based, and the WLAN is contention-based. The foregoing 2G, 3G, and 4G networks are all cellular communications networks. A person skilled in the art should learn that, with development of technologies, the technical solutions provided in the embodiments of the present invention may also be applied to another wireless communications network, for example, a 4.5G or 5G network, or another non-cellular communications network. For brevity, the wireless communications network may sometimes be briefly referred to as a network in the embodiments of the present invention.

The cellular communications network is a type of wireless communications network, and uses a cellular wireless networking mode to connect a terminal device and a network device through a wireless channel, so that users can communicate with each other during activities. The cellular communications network has a main feature of terminal mobility, and has functions of inter-cell handover and automatic roaming across a local network.

That the embodiments of the present invention are applied to a 5G NR communications system is used as an example below for description. That the network device is an eNB and the terminal is UE is used as an example for description. It should be noted that the solutions in the embodiments of the present invention may also be applied to another wireless communications network. A corresponding name may also be replaced by a name of a corresponding function in the another wireless communications network.

When UE performs various communication services, an eNB needs to configure a subframe structure for the UE. It can be understood that a process of configuring the subframe structure may also be referred to as a slot scheduling process. In the following description process in this embodiment of the present invention, "subframe" and "slot" are often used interchangeably, but a person skilled in the art can understand meanings thereof.

Figures 4, 5:
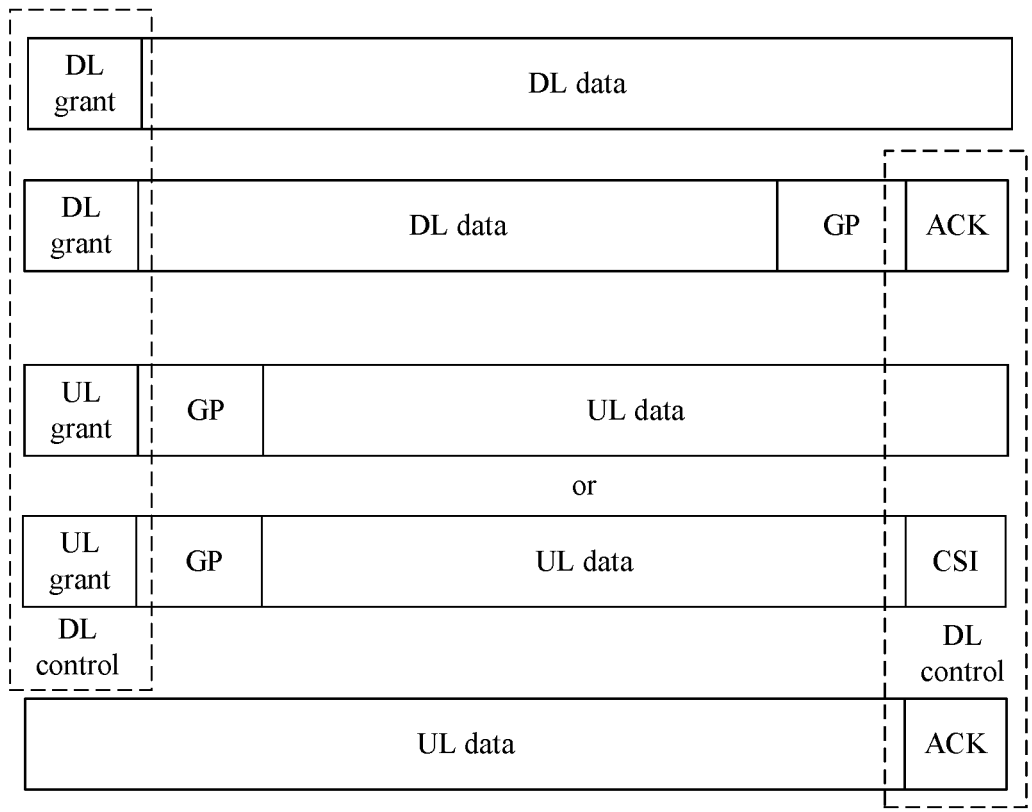
FIG. 4 is a schematic diagram of a self-contained subframe structure.
FIG. 5 is a schematic diagram of a subframe configuration with a subcarrier spacing of 15 kHz.

In 5G NR, a self-contained subframe structure is introduced to support various communication services (the various communication services include but are not limited to an eMBB service and a URLLC service). The self-contained subframe structure includes an orthogonal frequency division multiplexing (Orthogonal Frequency Division Multiplexing, OFDM) symbol used to transmit uplink data and an OFDM symbol used to transmit downlink data. FIG. 4 is a schematic diagram of the self-contained subframe structure. As shown in FIG. 4, the self-contained subframe structure includes three parts. The first part is downlink control (Downlink control, DL control), may be used to transmit a downlink grant (Downlink grant, DL grant) or an uplink grant (Uplink grant, UL grant), and is used to indicate resource configuration information to the UE. The second part is a data (data) part in which the eNB may transmit downlink (Downlink, DL) data or the UE may transmit uplink (Uplink, UL) data based on a resource previously allocated by the UL grant. The third part is uplink control (Uplink control, UL control). On this resource, the eNB may reply to the previous downlink data with an acknowledgement (Acknowledge, ACK) instruction or a negative acknowledgement (Negative Acknowledge, NACK) instruction, or transmit uplink channel state information (Channel State Information, CSI), to assist the eNB in subsequent scheduling of the UE.

To distinguish different types of subframes, a subframe in which downlink data is transmitted is referred to as a downlink-dominate slot including 14 symbols, and a subframe in which uplink data is transmitted is referred to as an uplink-dominate subframe. In the downlink-dominate slot including 14 symbols, the DL grant is transmitted in the DL control to indicate, to the UE, time-domain and frequency-domain locations at which the eNB is to transmit downlink data to the UE, so that the UE listens on corresponding time-domain and frequency-domain resources. After the DL grant is transmitted, the downlink data is transmitted. After the downlink data is transmitted, after a guard period (guard period, GP), the UE replies with an ACK or a NACK based on a result of decoding the downlink data. The guard period includes idle symbols. The idle symbol is a symbol in which no transmission is performed for a service, in other words, this service is not transmitted in the idle symbol, but another service may be transmitted in the idle symbol. For example, during this time period, the eNB does not perform eMBB transmission. In the uplink-dominate subframe, the UL grant is transmitted in the DL control part to indicate, to the UE, a time-domain and frequency-domain resource on which the UE should perform uplink transmission. There are mainly two cases. In one case, the eNB allocates a remaining time of the entire subframe to the UE to transmit uplink data. The UE transmits the uplink data after a GP until the subframe ends. In the other case, the eNB allocates only the data part for uplink transmission by the UE. In this case, after a GP, the UE transmits the uplink data based on a resource allocated in the UL grant, and after the transmission ends, uplink control information (for example, CSI) and the like are transmitted by the scheduled UE.

In 5G NR, UE and an eNB may support subframe configurations with a plurality of different types of subcarrier spacings. FIG. 5 shows a subframe configuration with a subcarrier spacing of 15 kHz. In FIG. 5, a downlink-only slot, a downlink-dominate slot including 14 symbols (an interval of uplink and downlink receive/transmit transition is one orthogonal frequency division multiplexing (Orthogonal Frequency Division Multiplexing, OFDM) symbol), a downlink-dominate slot including seven symbols (an interval of uplink and downlink receive/transmit transition is one OFDM symbol), an uplink-only slot, an uplink-dominate slot including 14 symbols (an interval of uplink and downlink receive/transmit transition is one OFDM symbol), and an uplink-dominate slot including seven symbols (an interval of uplink and downlink receive/transmit transition is one OFDM symbol) are from top to bottom in sequence. In FIG. 5, DL ctrl represents DL control, UL ctrl represents UL control, and numbers 1, 2, . . . , 14 respectively represent locations of OFDM symbols used to transmit DL or UL data.

In the embodiments of the present invention, to avoid interference between uplink data transmission and downlink data transmission described in the background, when a slot is scheduled, a transmission time and an idle time may be set in the slot, and the transmission time and the idle time are respectively used to transmit different services in an intra-frequency mode or an adjacent-frequency mode, to avoid interference between different services in the intra-frequency mode or the adjacent-frequency mode. For example, when a URLLC service and an eMBB service are in an intra-frequency mode, a time resource is reserved for the URLLC service at a specific location within a 1-ms subframe, to meet a requirement of a 0.5-ms latency of the URLLC service. In addition, a remaining time resource may be used for the eMBB service. In this way, interference to uplink and downlink transmission of the eMBB service can be avoided. For another example, when a URLLC service and an eMBB service are in an adjacent-frequency mode, a time resource is reserved for the URLLC service at a specific location within a 1-ms subframe, to meet a requirement of a 0.5-ms latency of the URLLC service. In addition, a time-domain location of the resource is correspondingly reserved in an adjacent frequency, and no transmission occurs in a direction opposite to a communication direction (an uplink communication direction and a downlink communication direction) of data transmitted for the URLLC service, thereby avoiding mutual interference.

Figure 6:
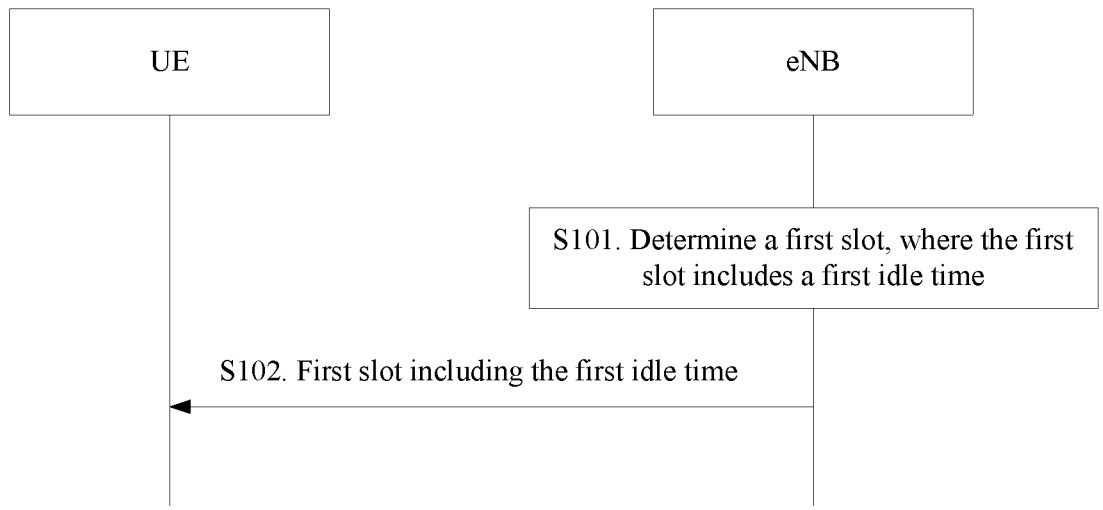
FIG. 6 is a flowchart of a slot scheduling method according to an embodiment of the present invention.

FIG. 6 is a flowchart of a slot scheduling method according to an embodiment of the present invention. Referring to FIG. 6, the slot scheduling method includes the following steps.

S101. An eNB determines a first slot, where the first slot includes a first idle time.

In this embodiment of the present invention, a time interval between a start moment of the first idle time and a start moment of the first slot is less than or equal to a preset time interval threshold, or a time interval between a start moment of the first idle time and an end moment of at least one OFDM symbol (a control channel) that is in the first slot and that is used to transmit control signaling is less than or equal to a preset time interval threshold.

The preset time interval threshold may be determined based on a requirement of a minimum latency required for a service to be actually transmitted. Usually, the preset time interval threshold is less than or equal to 1 millisecond. For example, if the first idle time is used to transmit uplink data or downlink data for a URLLC service, the preset time interval threshold may be 0.5 millisecond.

Figure 7:
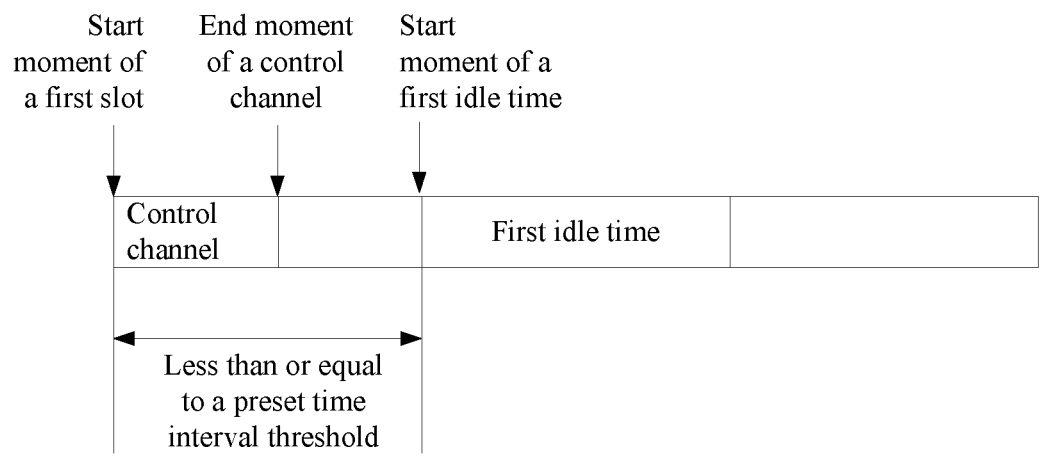
FIG. 7 is a schematic diagram of a slot structure according to an embodiment of the present invention.

FIG. 7 is a schematic diagram of a slot structure according to an embodiment of the present invention. In FIG. 7, a first slot includes a first idle time and a first transmission time. At least one of OFDM symbols included in the first transmission time is used to transmit a first service, and at least one of OFDM symbols included in the first idle time is used to transmit a second service. Both a time interval between a start moment of the first idle time and a start moment of the first slot and a time interval between the start moment of the first idle time and an end moment of at least one OFDM symbol (a control channel) that is in the first slot and that is used to transmit control signaling are less than or equal to a preset threshold. In an actual situation, the time interval between the start moment of the first idle time and the start moment of the first slot is less than or equal to the preset time interval threshold, and the time interval between the start moment of the first idle time and the end moment of the at least one OFDM symbol (a control channel) that is in the first slot and that is used to transmit control signaling is less than or equal to the preset time interval threshold. A requirement of avoiding interference between different services in an intra-frequency mode or an adjacent-frequency mode may be met provided that one of the two conditions is met.

S102. The eNB sends the determined first slot including the first idle time, and UE receives the first slot sent by the eNB, and transmits data based on a slot structure.

In this embodiment of the present invention, when the first slot includes seven OFDM symbols or 14 OFDM symbols, different slot structure scheduling manners may be used.

When the first slot includes seven OFDM symbols, the eNB may determine and send a second slot. The second slot includes a second idle time. For a structure of the second slot including the second idle time, refer to FIG. 7. A time interval between a start moment of the second idle time and a start moment of the second slot is less than or equal to a preset time interval threshold, or a time interval between a start moment of the second idle time and an end moment of at least one OFDM symbol (a control channel) that is in the second slot and that is used to transmit control signaling is less than or equal to a preset time interval threshold.

Figure 8:
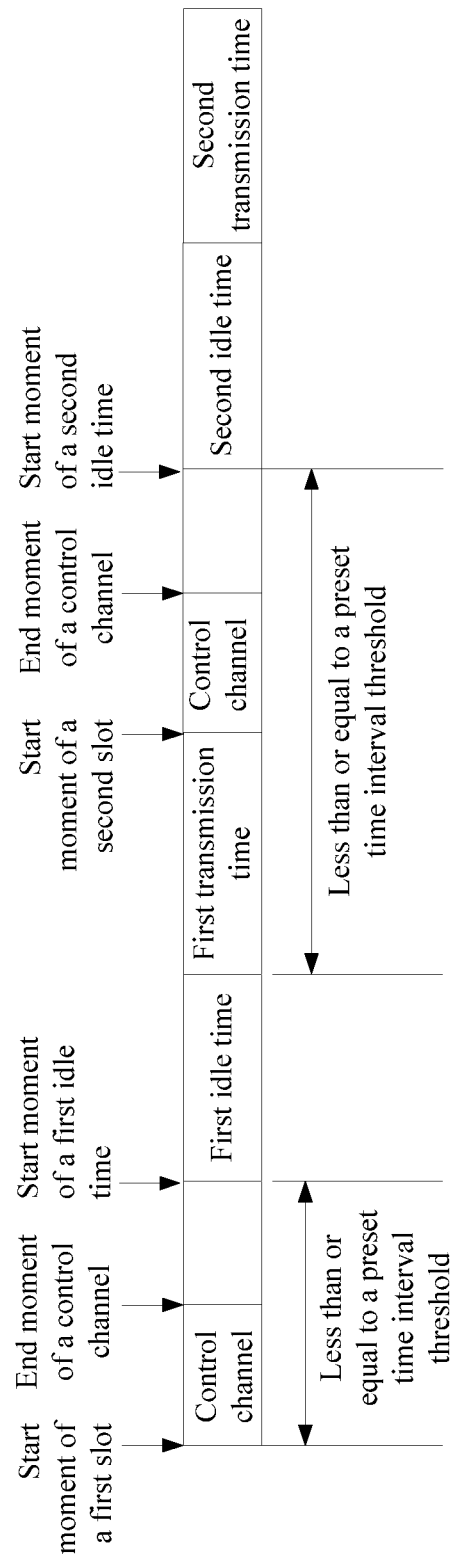
FIG. 8 is another schematic diagram of a slot structure according to an embodiment of the present invention.

In this embodiment of the present invention, to avoid interference between different services in an intra-frequency mode or an adjacent-frequency mode, a requirement that a time interval between the second idle time and the first idle time is less than or equal to the preset time interval threshold needs to be met, as shown in FIG. 8. For example, one of the following conditions needs to be met: A time interval between the start moment of the second idle time and the start moment of the first idle time is less than or equal to a preset time interval threshold, or a time interval between the start moment of the second idle time and an end moment of the first idle time is less than or equal to a preset time interval threshold, or a time interval between an end moment of the second idle time and the start moment of the first idle time is less than or equal to a preset time interval threshold, or a time interval between an end moment of the second idle time and an end moment of the first idle time is less than or equal to a preset time interval threshold.

In this embodiment of the present invention, the first slot may include seven OFDM symbols. To avoid interference between uplink data transmission and downlink data transmission, if an $N^{th}$ OFDM symbol in the first slot is an OFDM symbol that is in the seven OFDM symbols and that is used to transmit uplink data, it may be set that an $(N-1)^{th}$ or $(N-2)^{th}$ OFDM symbol belongs to the first idle time or the second idle time. If an $N^{th}$ OFDM symbol in the slot is an OFDM symbol that is in the seven OFDM symbols and that is used to transmit downlink data, it may be set that an $(N+1)^{th}$ or $(N+2)^{th}$ OFDM symbol belongs to the first idle time or the second idle time.

Figure 9:
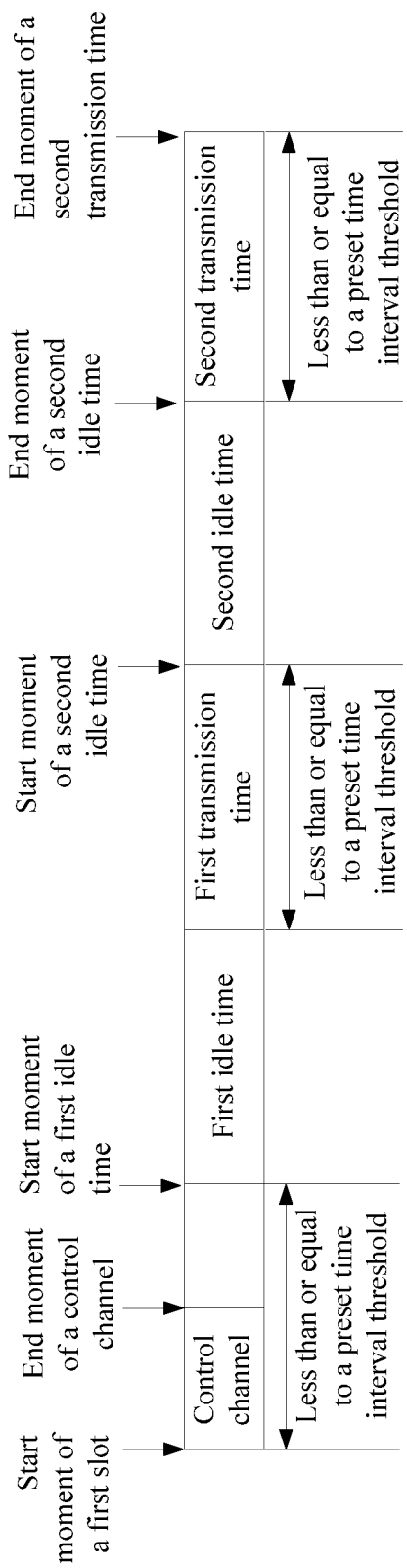
FIG. 9 is still another schematic diagram of a slot structure according to an embodiment of the present invention.

When the first slot includes 14 OFDM symbols, a second idle time and a second transmission time may be set in the first slot. As shown in FIG. 9, a time interval between a start moment of the first idle time and a start moment of the first slot is less than or equal to a preset time interval threshold, or a time interval between a start moment of the first idle time and an end moment of at least one OFDM symbol (a control channel) that is in the first slot and that is used to transmit control signaling is less than or equal to a preset time interval threshold, or a time interval between a start moment of the second idle time and a start moment of the second transmission time is less than or equal to a preset time interval threshold, or a time interval between a start moment of the second idle time and an end moment of the second transmission time is less than or equal to a preset time interval threshold. A time interval between the start moment of the second idle time and the start moment of the first idle time is less than or equal to a preset time interval threshold, or a time interval between the start moment of the second idle time and an end moment of the first idle time is less than or equal to a preset time interval threshold, or a time interval between an end moment of the second idle time and the start moment of the first idle time is less than or equal to a preset time interval threshold, or a time interval between an end moment of the second idle time and an end moment of the first idle time is less than or equal to a preset time interval threshold.

In this embodiment of the present invention, the first slot includes 14 OFDM symbols. Referring to the uplink-only slot or the downlink-only slot in FIG. 5, if an $N^{th}$ OFDM symbol in the first slot is one of first to sixth OFDM symbols in the slot, at least one of the $N^{th}$ OFDM symbol, an $(N+1)^{th}$ OFDM symbol, an $(N+7)^{th}$ OFDM symbol, and an $(N+8)^{th}$ OFDM symbol that are in the slot may be set to the first idle time.

Referring again to the slot structure shown in FIG. 5, to avoid interference between uplink data transmission and downlink data transmission, if the $N^{th}$ OFDM symbol in the first slot is an OFDM symbol that is in the 14 OFDM symbols and that is used to transmit uplink data, at least one of an $(N-2)^{th}$ OFDM symbol, an $(N-1)^{th}$ OFDM symbol, an $(N-8)^{th}$ OFDM symbol, and an $(N-7)^{th}$ OFDM symbol that are in the first slot may be set to the first idle time or the second idle time. If the $N^{th}$ OFDM symbol in the first slot is an OFDM symbol that is in the 14 OFDM symbols and that is used to transmit downlink data, at least one of an $(N+1)^{th}$ OFDM symbol, an $(N+2)^{th}$ OFDM symbol, an $(N+7)^{th}$ OFDM symbol, and an $(N+8)^{th}$ OFDM symbol that are in the first slot may be set to the first idle time or the second idle time.

In this embodiment of the present invention, for an adjacent-frequency mode, to be specific, the slot occupies at least two frequency bands in frequency domain, it is assumed that the at least two frequency bands include a first frequency band and a second frequency band, and the first idle time or the second idle time is in the first frequency band. To avoid interference between uplink data transmission and downlink data transmission, the slot may be scheduled in the following manners: A communication direction of data transmitted in another OFDM symbol that is in the first frequency band and that is other than the OFDM symbol included in the first idle time, the OFDM symbol included in the second idle time, and the $N^{th}$ OFDM symbol is opposite to a communication direction of data transmitted in the $N^{th}$ OFDM symbol. A communication direction of data transmitted in an OFDM symbol that is in the second frequency band and that corresponds to the first idle time and the second idle time in the first frequency band at a time-domain symbol location is the same as the communication direction of the data transmitted in the $N^{th}$ symbol. A communication direction of data transmitted in another OFDM symbol that is in the second frequency band and that is other than the OFDM symbol corresponding to the first idle time and the second idle time in the first frequency band at the time-domain symbol location is opposite to the communication direction of the data transmitted in the $N^{th}$ symbol.

In this embodiment of the present invention, the communication direction includes an uplink communication direction and a downlink communication direction. That the communication directions are opposite means that if the communication direction of the data transmitted in the another OFDM symbol that is in the first frequency band and that is other than the OFDM symbol included in the first idle time, the OFDM symbol included in the second idle time, and the $N^{th}$ OFDM symbol is the uplink communication direction, the communication direction of the data transmitted in the $N^{th}$ OFDM symbol is the downlink communication direction. That the communication directions are the same means that if the communication direction of the data transmitted in the another OFDM symbol that is in the first frequency band and that is other than the OFDM symbol included in the first idle time, the OFDM symbol included in the second idle time, and the $N^{th}$ OFDM symbol is the uplink communication direction, the communication direction of the data transmitted in the OFDM symbol that is in the second frequency band and that corresponds to the first idle time and the second idle time in the first frequency band at the time-domain symbol location is the downlink communication direction.

In this embodiment of the present invention, if the slot includes idle OFDM symbols (for example, the GP in FIG. 5) used for receive/transmit transition, at least two idle OFDM symbols used for receive/transmit transition may be set, to reserve enough time to implement transition between transmission of the first service and transmission of the second service.

In this embodiment of the present invention, when the eNB determines the OFDM symbol that is in the first transmission time and that is used to transmit the first service and the OFDM symbol that is in the first idle time and that is used to transmit the second service, to schedule the UE, in an implementation, the eNB may send indication information to the UE, where the indication information is used to indicate the at least one OFDM symbol that is in the first idle time and that is used to transmit the second service, and/or used to indicate at least one OFDM symbol that is in at least one first transmission time and that is used to transmit the first service. The indication information may be sent by using downlink control information (Downlink Control Information, DCI), radio resource control (Radio Resource Control, RRC) information, or the like. In another implementation, a predefined manner may also be used to define at least one OFDM symbol that is in the first idle time and that is used to transmit second service data.

In this embodiment of the present invention, the idle time is set in the slot. In this case, when scheduling the first service, the eNB may cancel or not schedule transmission of first service data in the first idle time. Because the eNB cancels or does not schedule the transmission of the first service data, the UE does not transmit the first service data in the first idle time.

The foregoing slot structure is described below in the embodiments of the present invention with reference to actual applications.

In the embodiments of the present invention, that the first service is an eMBB service and the second service is a URLLC service is used as an example and various slot types in FIG. 5 are used, to describe an implementation process in which an idle time is set for the URLLC service within a 1-millisecond subframe to meet a 0.5-millisecond latency requirement of the URLLC service and avoid mutual interference between uplink data and downlink data of the eMBB service and the URLLC service.

Embodiment 1

It is assumed that a current slot for transmitting eMBB service data is a downlink-only slot, a downlink-dominate slot including 14 OFDM symbols, or a downlink-dominate slot including seven OFDM symbols, and an idle time of receive/transmit transition on an eNB side is defined as a receive/transmit transition idle time 624 Ts in the existing LTE standard.

An eNB determines an uplink resource time-domain location at which URLLC service data is transmitted. The uplink resource time-domain location at which the URLLC service data is transmitted may be predefined in the standard, or may uniquely correspond to a type of the current slot (the current slot is the downlink-only slot, the downlink-dominate slot including 14 OFDM symbols, or the downlink-dominate slot including seven OFDM symbols). In the downlink-only slot, an eMBB service is not performed in a sixth OFDM symbol or a thirteenth OFDM symbol. The OFDM symbol in which the eMBB service is not performed is an OFDM symbol in a first idle time and a second idle time. In the downlink-dominate slot including seven OFDM symbols, if a number of an OFDM symbol at which eMBB uplink transmission starts is N, an eMBB service is not performed in an $(N-2)^{th}$ or $(N-1)^{th}$ OFDM symbol. In the downlink-dominate slot including 14 OFDM symbols, if a number of an OFDM symbol at which eMBB uplink transmission starts is N, an eMBB service is not performed in an $(N-2)^{th}$, $(N-1)^{th}$, $(N-8)^{th}$, or $(N-7)^{th}$ OFDM symbol.

For example, in this embodiment of the present invention, the sixth OFDM symbol or the thirteenth OFDM symbol is used as the uplink resource time-domain location at which the URLLC service data is transmitted.

The eNB determines the uplink resource time-domain location at which the URLLC service data is transmitted, and may indicate a slot type by signaling, and schedule eMBB downlink transmission and URLLC uplink transmission. The slot type indicated by the eNB includes a reserved idle OFDM symbol location. The signaling may be RRC signaling or downlink control signaling. In this embodiment of the present invention, same signaling may indicate a time-domain location at which eMBB downlink transmission is performed and a time-domain location at which URLLC uplink transmission is performed.

Optionally, in the downlink-dominate slot including seven OFDM symbols, it is specified by the standard or notified by eNB signaling that a URLLC uplink resource is located at a time-domain location that is one OFDM symbol previous to the OFDM symbol at which eMBB uplink transmission starts. Optionally, in the downlink-dominate slot including 14 OFDM symbols, it is specified by the standard or notified by eNB signaling that a URLLC uplink resource is located at a time-domain location that is one OFDM symbol or eight OFDM symbols previous to the OFDM symbol at which eMBB uplink transmission starts.

Figure 10:
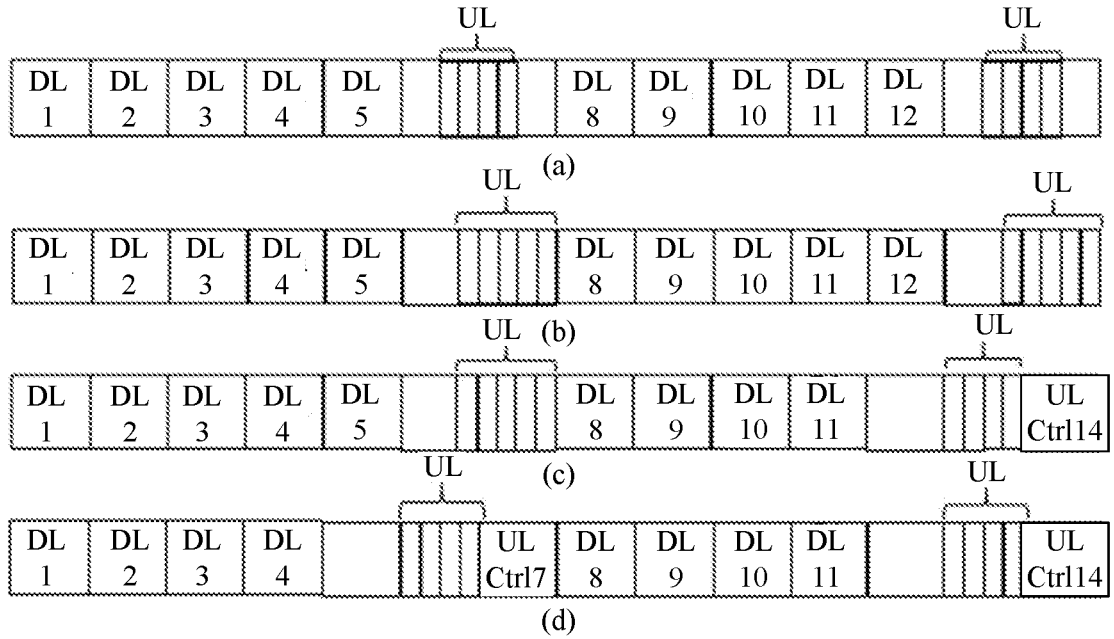
FIG. 10 is a schematic diagram of number locations of OFDM symbols for scheduling eMBB downlink transmission and URLLC uplink transmission.

In this embodiment of the present invention, number locations of OFDM symbols for scheduling eMBB downlink transmission and URLLC uplink transmission are shown in FIG. 10.

The downlink-only slot is shown in (a) and (b) in FIG. 10. In (a) and (b), the eNB transmits downlink data in first to fifth OFDM symbols, and transmits downlink data in eighth to twelfth OFDM symbols. Locations of sixth, seventh, thirteenth, and fourteenth OFDM symbols are reserved in advance for URLLC uplink transmission. Numbers of the OFDM symbols reserved in advance may be specified in the standard or indicated by the eNB to URLLC UE to perform receiving at the locations. Optionally, in the reserved sixth and seventh OFDM symbols, one to five URLLC uplink OFDM symbols may be transmitted. In (a), for URLLC, after a time (624 Ts) of transition from sending to receiving on the eNB side is reserved after the fifth OFDM symbol ends, the eNB receives a signal of the URLLC uplink transmission. Likewise, for URLLC, after a time of receive/transmit transition on the eNB side is reserved after the twelfth OFDM symbol ends, the eNB receives a signal of the URLLC uplink transmission. Because there may be a transmission delay between the URLLC UE and the eNB, the URLLC UE needs to estimate a transmission delay time amount and sends URLLC UL data in advance, so that after the transmission delay, the URLLC UL data can be displayed at a location shown in (a) in FIG. 10. It should be noted that (b) is different from (a) in the location of the URLLC uplink transmission. In this case, although it is specified that the URLLC UE may perform transmission at the location of the seventh OFDM symbol, the URLLC UE may consider an advance amount of 624 Ts for sending, so that a time at which the eNB actually receives the URLLC UL data is earlier than a location shown in (b), where a timing advance is 624 Ts. In this way, after the URLLC UL ends, a time at which the URLLC UL ends is 624 Ts earlier than a location, shown in (b), at which the eighth OFDM symbol starts. In this way, the eNB has enough time to perform receive/transmit transition, and then continues to send the eighth to twelfth downlink OFDM symbols. After this embodiment, if the uplink ends and the downlink transmission follows closely, the uplink transmission uses a timing advance step by default.

For the downlink-dominate slot including 14 OFDM symbols, as shown in (c) in FIG. 10, the eNB transmits downlink data in first to fifth OFDM symbols, transmits downlink data in eighth to eleventh OFDM symbols, and receives uplink data in a fourteenth OFDM symbol. Locations of sixth, seventh, twelfth, and thirteenth OFDM symbols are reserved in advance for URLLC uplink transmission. The URLLC uplink transmission uses a timing advance. For (c), when a GP of only one OFDM symbol is required between a downlink and an uplink of a 15 kHz subcarrier spacing, to support the URLLC transmission, the GP needs to be additionally increased, to provide a URLLC transmission opportunity. The increase in the GP may be indicated by signaling. When duration of the GP is greater than one OFDM symbol, an OFDM symbol in the GP may be reserved for the URLLC uplink transmission, and a location of the OFDM symbol reserved in the GP may be specified in the standard or indicated by the eNB to the URLLC UE. Optionally, the OFDM symbol reserved in the GP is the thirteenth OFDM symbol.

For the downlink-dominate slot including seven OFDM symbols, as shown in (d) in FIG. 10, the eNB transmits downlink data in first to fourth OFDM symbols, transmits downlink data in eighth to eleventh OFDM symbols, and receives uplink data in seventh and fourteenth OFDM symbols. Locations of fifth, sixth, twelfth, and thirteenth OFDM symbols are reserved in advance for URLLC uplink transmission. The URLLC uplink transmission uses a timing advance. For (d), when a GP of only one OFDM symbol is required between a downlink and an uplink of a 15 kHz subcarrier spacing, to support the URLLC transmission, the GP needs to be additionally increased, to provide a URLLC transmission opportunity. The increase in the GP may be indicated by signaling. When duration of the GP is greater than one OFDM symbol, an OFDM symbol in the GP may be reserved for the URLLC uplink transmission, and a location of the OFDM symbol reserved in the GP may be specified in the standard or indicated by the eNB to the URLLC UE. Optionally, the OFDM symbol reserved in the GP is the sixth OFDM symbol or the thirteenth OFDM symbol.

In Embodiment 1 of the present invention, the eMBB service is not scheduled at a specific location in a subframe, thereby providing a transmission opportunity for URLLC. In addition, time-domain locations of the URLLC uplink transmission and the eMBB transmission do not overlap, thereby avoiding mutual interference. In addition, an interval between two adjacent transmission opportunities of the URLLC uplink transmission does not exceed 0.5 ms, thereby meeting a URLLC latency requirement.

Embodiment 2

It is assumed that a current slot for transmitting eMBB service data is an uplink-only slot, an uplink-dominate slot including 14 OFDM symbols, or an uplink-dominate slot including seven OFDM symbols, and an idle time of receive/transmit transition on an eNB side is defined as a receive/transmit transition idle time 624 Ts in the existing LTE standard.

An eNB determines a downlink resource time-domain location at which URLLC service data is transmitted. The downlink resource time-domain location at which the URLLC service data is transmitted may be predefined in the standard, or may uniquely correspond to a type of the current slot (the current slot is the uplink-only slot, the uplink-dominate slot including 14 OFDM symbols, or the uplink-dominate slot including seven OFDM symbols). In the uplink-only slot, an eMBB service is not performed in a second OFDM symbol or a ninth OFDM symbol. In the uplink-dominate slot including seven OFDM symbols, if a number of an OFDM symbol at which eMBB downlink transmission ends is N, an eMBB service is not performed in an $(N+1)^{th}$ or $(N+2)^{th}$ OFDM symbol. In the uplink-dominate slot including 14 OFDM symbols, if a number of an OFDM symbol at which eMBB downlink transmission ends is N, an eMBB service is not performed in an $(N+1)^{th}$, $(N+2)^{th}$, $(N+7)^{th}$, or $(N+8)^{th}$ OFDM symbol.

For example, in this embodiment of the present invention, the second OFDM symbol or the ninth OFDM symbol is used as the downlink resource time-domain location at which the URLLC service data is transmitted.

After determining the downlink resource time-domain location at which the URLLC service data is transmitted, the eNB may indicate a slot type by signaling, and schedule eMBB uplink transmission and URLLC downlink transmission. The slot type indicated by the eNB includes a reserved idle OFDM symbol location. The signaling may be RRC signaling or downlink control signaling. In this embodiment of the present invention, same signaling may indicate a time-domain location at which eMBB uplink transmission is performed and a time-domain location at which URLLC downlink transmission is performed.

Optionally, in the uplink-dominate slot including seven OFDM symbols, it is specified by the standard or notified by eNB signaling that a URLLC downlink resource is located at a time-domain location that is one OFDM symbol subsequent to the OFDM symbol at which eMBB downlink transmission ends. Optionally, in the uplink-dominate slot including 14 OFDM symbols, it is specified by the standard or notified by eNB signaling that a URLLC downlink resource is located at a time-domain location that is one OFDM symbol or eight OFDM symbols subsequent to the OFDM symbol at which eMBB downlink transmission ends.

Figure 11:
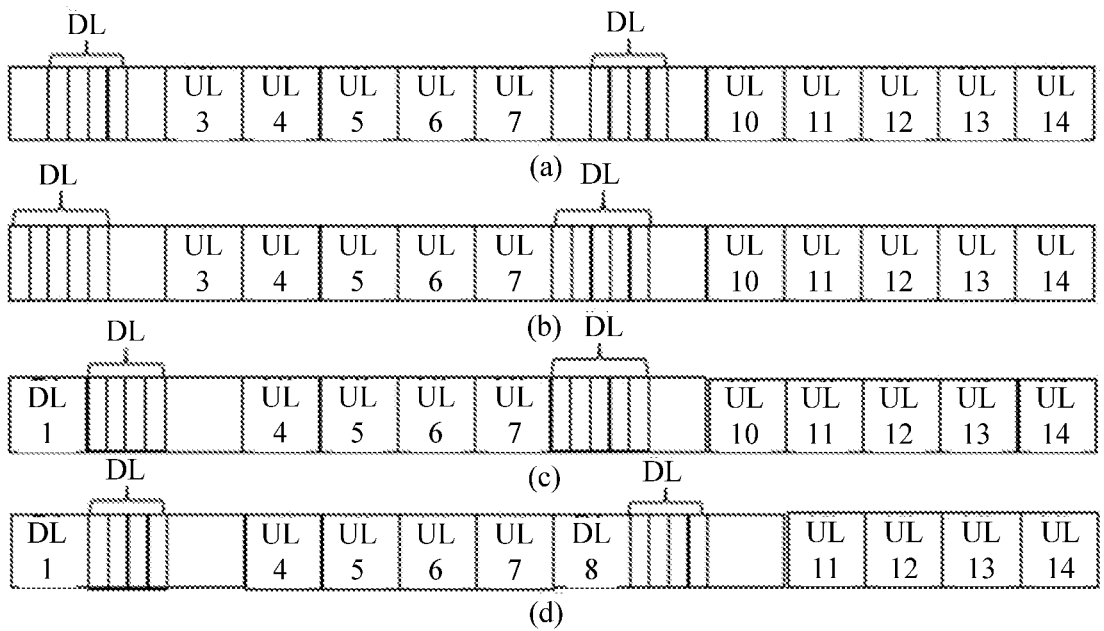
FIG. 11 is a schematic diagram of number locations of OFDM symbols for scheduling eMBB uplink transmission and URLLC downlink transmission.

In this embodiment of the present invention, number locations of OFDM symbols for scheduling eMBB uplink transmission and URLLC downlink transmission are shown in FIG. 11.

The uplink-only slot is shown in (a) and (b) in FIG. 11. In (a) and (b), the eNB transmits uplink data in third to seventh OFDM symbols, and transmits uplink data in tenth to fourteenth OFDM symbols. Locations of first and eighth OFDM symbols are reserved in advance for URLLC downlink transmission. Numbers of the OFDM symbols reserved in advance may be specified in the standard or indicated by the eNB to URLLC UE to perform receiving at the locations. In (a), for URLLC, after a time (624 Ts) of transition from sending to receiving on the eNB side is reserved after the seventh OFDM symbol ends, the eNB sends a signal of the URLLC downlink transmission. Likewise, for URLLC, after a time of receive/transmit transition on the eNB side is reserved in the first OFDM symbol, the eNB sends a signal of the URLLC downlink transmission. Because there may be a transmission delay between the UE and the eNB, the UE needs to estimate a transmission delay time amount and transmit UL data in advance. In FIG. 11, (b) is different from (a) in the location of the URLLC downlink transmission. In this case, although it is specified that the UE may perform transmission at the location of the seventh OFDM symbol, the UE may consider an advance amount of 624 Ts for sending, so that a time at which the eNB actually receives the UL data is earlier than a location shown in (b) in FIG. 11, where a timing advance is 624 Ts. In this way, after the UL ends, a time at which the UL ends is 624 Ts earlier than a location, shown in (b) in FIG. 11, at which the eighth OFDM symbol starts. In this way, the eNB has enough time to perform receive/transmit transition, and then continues to send a URLLC downlink OFDM symbol.

For the uplink-dominate slot including 14 OFDM symbols, as shown in (c) in FIG. 11, the eNB performs downlink transmission in a first OFDM symbol, and receives uplink transmission in fourth to seventh OFDM symbols and tenth to fourteenth OFDM symbols. Locations of second, third, eighth, and ninth OFDM symbols are reserved in advance for URLLC downlink transmission. For (c) in FIG. 11, when a GP of only one OFDM symbol is required between a downlink and an uplink of a 15 kHz subcarrier spacing, to support the URLLC transmission, the GP needs to be additionally increased, to provide a URLLC transmission opportunity. The increase in the GP may be indicated by signaling. When duration of the GP is greater than one OFDM symbol, an OFDM symbol in the GP may be reserved for the URLLC uplink transmission, and a location of the OFDM symbol reserved in the GP may be specified in the standard or indicated by the eNB to the URLLC UE. Optionally, the OFDM symbol reserved in the GP is the second OFDM symbol.

For the uplink-dominate slot including seven OFDM symbols, as shown in (d) in FIG. 11 in Embodiment 2, the eNB performs downlink transmission in first and eighth OFDM symbols, and receives uplink transmission in fourth to seventh OFDM symbols and eleventh to fourteenth OFDM symbols. Locations of second, third, ninth, and tenth OFDM symbols are reserved in advance for URLLC downlink transmission. For (d) in FIG. 11, when a GP of only one OFDM symbol is required between a downlink and an uplink of a 15 kHz subcarrier spacing, to support the URLLC transmission, the GP needs to be additionally increased, to provide a URLLC transmission opportunity. The increase in the GP may be indicated by signaling. When duration of the GP is greater than one OFDM symbol, an OFDM symbol in the GP may be reserved for the URLLC uplink transmission, and a location of the OFDM symbol reserved in the GP may be specified in the standard or indicated by the eNB to the URLLC UE. Optionally, the OFDM symbols reserved in the GP are the second OFDM symbol and the ninth OFDM symbol.

In Embodiment 2 of the present invention, the eMBB service is not scheduled at a specific location in a subframe, thereby providing a transmission opportunity for URLLC. In addition, time-domain locations of the URLLC uplink transmission and the eMBB transmission do not overlap, thereby avoiding mutual interference. In addition, an interval between two adjacent transmission opportunities of the URLLC uplink transmission does not exceed 0.5 ms, thereby meeting a URLLC latency requirement.

Embodiment 3

It is assumed that a current slot for transmitting eMBB service data is a downlink-only slot, a downlink-dominate slot including 14 OFDM symbols, or a downlink-dominate slot including seven OFDM symbols, and an idle time of receive/transmit transition on an eNB side is defined as a receive/transmit transition idle time less than or equal to 548 Ts in the existing LTE standard. It should be noted that, when a receive/transmit transition time is reduced to 548 Ts or less, a quantity of idle OFDM symbols reserved for eMBB downlink transmission is reduced, thereby improving eMBB transmission efficiency.

An eNB determines an uplink resource time-domain location at which URLLC service data is transmitted. The uplink resource time-domain location at which the URLLC service data is transmitted may be predefined in the standard, or may uniquely correspond to a type of the current slot (the current slot is the downlink-only slot, the downlink-dominate slot including 14 OFDM symbols, or the downlink-dominate slot including seven OFDM symbols). In the downlink-only slot, an eMBB service is not performed in a sixth or thirteenth OFDM symbol. In the downlink-dominate slot including 14 OFDM symbols, if a number of an OFDM symbol at which eMBB uplink transmission starts is N, an eMBB service is not performed in $(N-1)^{th}$ and $(N-8)^{th}$ OFDM symbols.

For example, in this embodiment of the present invention, the sixth OFDM symbol or the thirteenth OFDM symbol is used as the uplink resource time-domain location at which the URLLC service data is transmitted.

The eNB determines the uplink resource time-domain location at which the URLLC service data is transmitted, and may indicate a slot type by signaling, and schedule eMBB downlink transmission and URLLC uplink transmission. The slot type indicated by the eNB includes a reserved idle OFDM symbol location. The signaling may be RRC signaling or downlink control signaling. In this embodiment of the present invention, same signaling may indicate a time-domain location at which eMBB downlink transmission is performed and a time-domain location at which URLLC uplink transmission is performed.

Optionally, in the downlink-dominate slot including 14 OFDM symbols, it is specified by the standard or notified by eNB signaling that a URLLC uplink resource is located at a time-domain location that is one OFDM symbol or eight OFDM symbols previous to the OFDM symbol at which eMBB uplink transmission starts.

Figure 12:
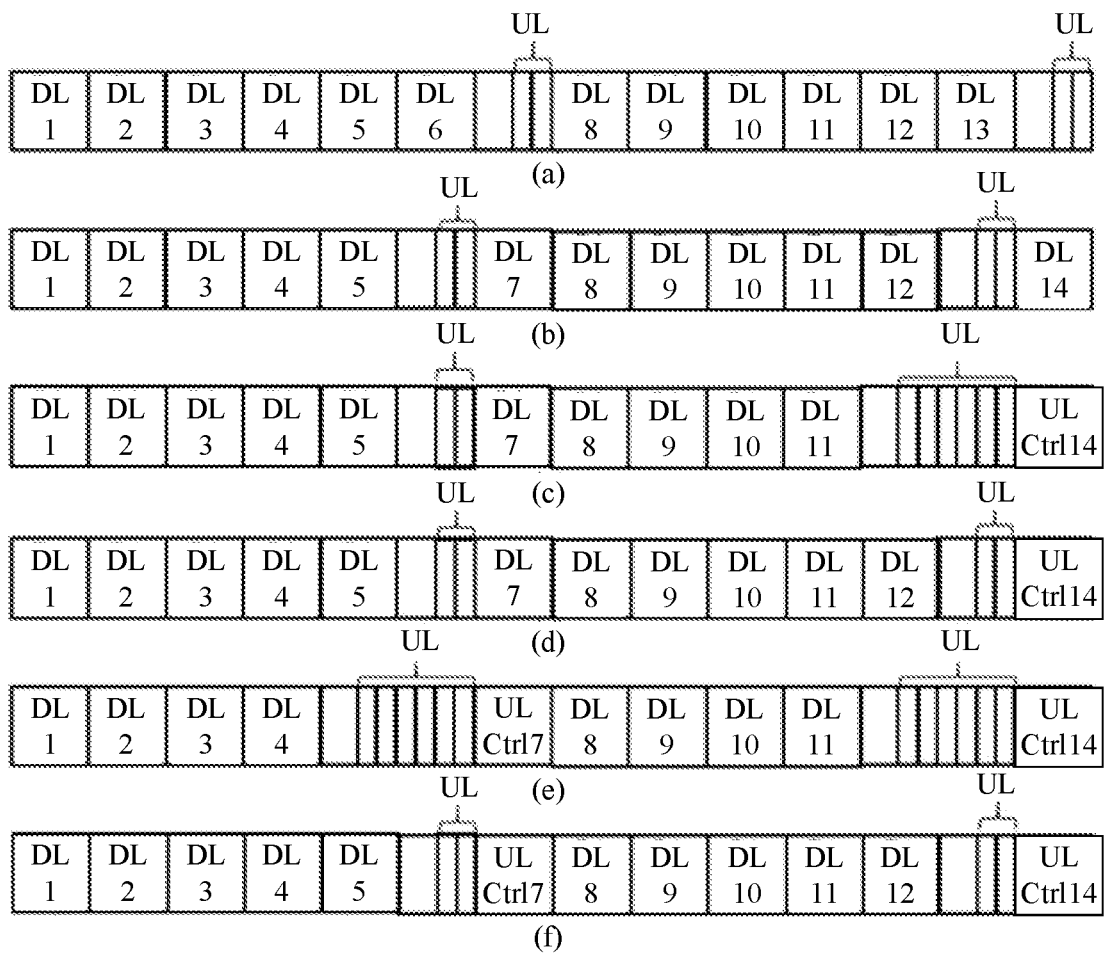
FIG. 12 is another schematic diagram of number locations of OFDM symbols for scheduling eMBB downlink transmission and URLLC uplink transmission.

In this embodiment of the present invention, number locations of OFDM symbols for scheduling eMBB downlink transmission and URLLC uplink transmission are shown in FIG. 12.

The downlink-only slot is shown in (a) and (b) in FIG. 12. In (a) in FIG. 12, the eNB transmits downlink data in first to sixth OFDM symbols, and transmits downlink data in eighth to thirteenth OFDM symbols. Locations of seventh and fourteenth OFDM symbols are reserved in advance for URLLC uplink transmission. Numbers of the OFDM symbols reserved in advance may be specified in the standard or indicated by the eNB to URLLC UE to perform receiving at the locations. Optionally, in the reserved seventh and fourteenth OFDM symbols, one or two URLLC uplink OFDM symbols may be transmitted. In (b) in FIG. 12, the eNB transmits downlink data in first to fifth OFDM symbols, and transmits downlink data in seventh to twelfth OFDM symbols and a fourteenth OFDM symbol. Locations of sixth and thirteenth OFDM symbols are reserved in advance for URLLC uplink transmission. Numbers of the OFDM symbols reserved in advance may be specified in the standard or indicated by the eNB to URLLC UE to perform receiving at the locations. Optionally, in the reserved sixth and thirteenth OFDM symbols, one or two URLLC uplink OFDM symbols may be transmitted. In (a) in FIG. 12, for URLLC, after a time (548 Ts) of transition from sending to receiving on the eNB side is reserved after the sixth OFDM symbol ends, the eNB receives a signal of the URLLC uplink transmission. Likewise, for URLLC, after a time of receive/transmit transition on the eNB side is reserved after the thirteenth OFDM symbol ends, the eNB receives a signal of the URLLC uplink transmission. Because there may be a transmission delay between the URLLC UE and the eNB, the URLLC UE needs to estimate a transmission delay time amount and send URLLC UL data in advance.

For the downlink-dominate slot including 14 OFDM symbols, as shown in (c) in FIG. 12, the eNB transmits downlink data in first to fifth OFDM symbols, transmits downlink data in seventh to eleventh OFDM symbols, and receives uplink data in a fourteenth OFDM symbol. Locations of sixth, twelfth, and thirteenth OFDM symbols are reserved in advance for URLLC uplink transmission. The URLLC uplink transmission uses a timing advance. A difference between (d) and (c) in FIG. 12 lies in whether the twelfth OFDM symbol is used for URLLC transmission because GPs in the two figures are different. When the GP has two OFDM symbols shown in (c) in FIG. 12, more resources may be provided for URLLC transmission.

The downlink-dominate slot including seven OFDM symbols is shown in (e) and (f) in FIG. 12. In (e) in FIG. 12, the eNB transmits downlink data in first to fourth OFDM symbols, transmits downlink data in eighth to eleventh OFDM symbols, and receives uplink data in seventh and fourteenth OFDM symbols. Locations of fifth, sixth, twelfth, and thirteenth OFDM symbols are reserved in advance for URLLC uplink transmission. The URLLC uplink transmission uses a timing advance. In (f) in FIG. 12, the eNB transmits downlink data in first to fifth OFDM symbols, transmits downlink data in eighth to twelfth OFDM symbols, and receives uplink data in seventh and fourteenth OFDM symbols. Locations of sixth and thirteenth OFDM symbols are reserved in advance for URLLC uplink transmission. The URLLC uplink transmission uses a timing advance. Locations of these OFDM symbols may be specified in the standard or indicated by the eNB to URLLC UE.

It can be learned from (b) to (f) in FIG. 12, shared URLLC resources are located in the sixth OFDM symbol and the thirteenth OFDM symbol. Locations of the shared URLLC resources may be specified in the standard or locations of these shared URLLC resources may be indicated by the eNB to the URLLC UE through broadcast or signaling.

In Embodiment 3 of the present invention, the eMBB service is not scheduled at a specific location in a subframe, thereby providing a transmission opportunity for URLLC. In addition, time-domain locations of the URLLC uplink transmission and the eMBB transmission do not overlap, thereby avoiding mutual interference. In addition, an interval between two adjacent transmission opportunities of the URLLC uplink transmission does not exceed 0.5 ms, thereby meeting a URLLC latency requirement.

In addition, compared with Embodiment 1, in Embodiment 3 of the present invention, impact on the eMBB service is reduced, and spectrum efficiency is improved.

Embodiment 4

It is assumed that a current slot for transmitting eMBB service data is an uplink-only slot, an uplink-dominate slot including 14 OFDM symbols, or an uplink-dominate slot including seven OFDM symbols, and an idle time of receive/transmit transition on an eNB side is defined as a receive/transmit transition idle time less than or equal to 548 Ts in the existing LTE standard. It should be noted that, when a receive/transmit transition time is reduced to 548 Ts or less, a quantity of idle OFDM symbols reserved for eMBB downlink transmission is reduced, thereby improving eMBB transmission efficiency.

An eNB determines a downlink resource time-domain location at which URLLC service data is transmitted. The downlink resource time-domain location at which the URLLC service data is transmitted may be predefined in the standard, or may uniquely correspond to a type of the current slot (the current slot is the uplink-only slot, the uplink-dominate slot including 14 OFDM symbols, or the uplink-dominate slot including seven OFDM symbols). In the uplink-only slot, an eMBB service is not performed in a first OFDM symbol or an eighth OFDM symbol. In the uplink-dominate slot including seven OFDM symbols, if a number of an OFDM symbol at which eMBB downlink transmission ends is N, an eMBB service is not performed in an $(N+1)^{th}$ OFDM symbol. In the uplink-dominate slot including 14 OFDM symbols, if a number of an OFDM symbol at which eMBB downlink transmission ends is N, an eMBB service is not performed in an $(N+1)^{th}$ or $(N+8)^{th}$ OFDM symbol.

For example, in this embodiment of the present invention, a second OFDM symbol or a ninth OFDM symbol is used as the downlink resource time-domain location at which the URLLC service data is transmitted.

After determining the downlink resource time-domain location at which the URLLC service data is transmitted, the eNB may indicate a slot type by signaling, and schedule eMBB uplink transmission and URLLC downlink transmission. The slot type indicated by the eNB includes a reserved idle OFDM symbol location. The signaling may be RRC signaling or downlink control signaling. In this embodiment of the present invention, same signaling may indicate a time-domain location at which eMBB uplink transmission is performed and a time-domain location at which URLLC downlink transmission is performed.

Optionally, in the uplink-dominate slot including seven OFDM symbols, it is specified by the standard or notified by eNB signaling that a URLLC downlink resource is located at a time-domain location that is one OFDM symbol subsequent to the OFDM symbol at which eMBB downlink transmission ends. Optionally, in the uplink-dominate slot including 14 OFDM symbols, it is specified by the standard or notified by eNB signaling that a URLLC downlink resource is located at a time-domain location that is one OFDM symbol or eight OFDM symbols subsequent to the OFDM symbol at which eMBB downlink transmission ends.

Figure 13:
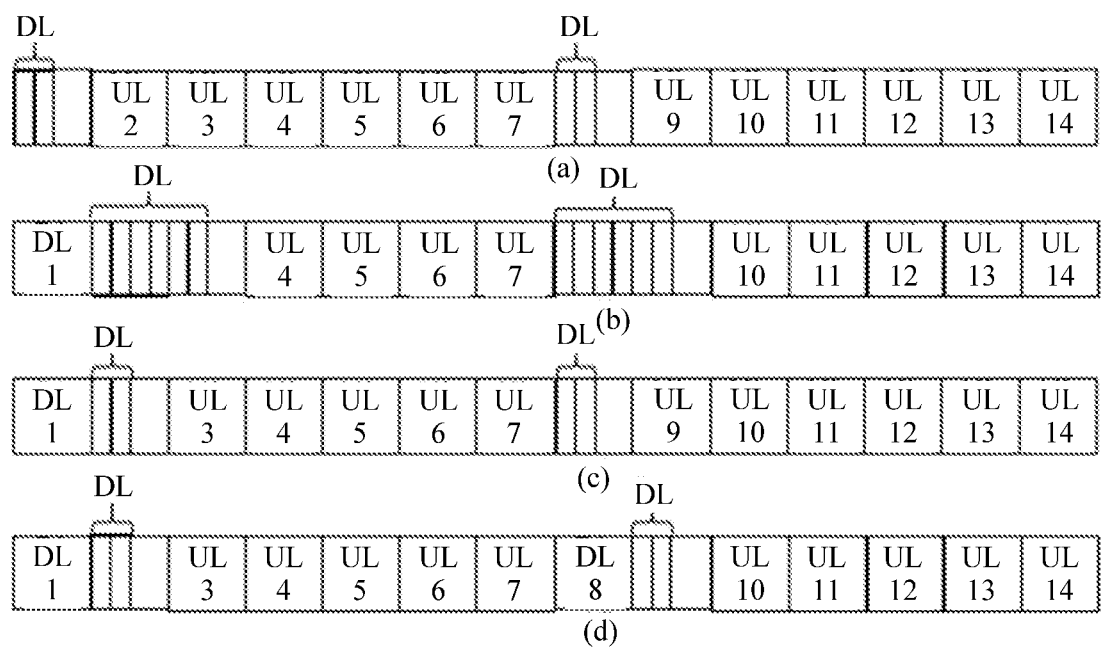
FIG. 13 is another schematic diagram of number locations of OFDM symbols for scheduling eMBB uplink transmission and URLLC downlink transmission.

In this embodiment of the present invention, number locations of OFDM symbols for scheduling eMBB uplink transmission and URLLC downlink transmission are shown in FIG. 13.

The uplink-only slot is shown in (a) in FIG. 13. In (a) in FIG. 13, the eNB transmits uplink data in second to seventh OFDM symbols, and transmits uplink data in ninth to fourteenth OFDM symbols. Locations of first and eighth OFDM symbols are reserved in advance for URLLC downlink transmission. Numbers of the OFDM symbols reserved in advance may be specified in the standard or indicated by the eNB to URLLC UE to perform receiving at the locations. Optionally, in the reserved first and eighth OFDM symbols, one or two URLLC downlink OFDM symbols may be transmitted. In (a) in FIG. 13, for URLLC, after a time (548 Ts) of transition from sending to receiving on the eNB side is reserved after transmission in the first OFDM symbol ends, the eNB receives a signal of the uplink transmission. Likewise, for URLLC, after a time of receive/transmit transition on the eNB side is reserved after transmission in a time of the seventh OFDM symbol ends, the eNB receives a signal of the URLLC downlink transmission. Because there may be a transmission delay between the URLLC UE and the eNB, the URLLC UE needs to estimate a transmission delay time amount and send URLLC UL data in advance.

The downlink-dominate slot including 14 OFDM symbols is shown in (b) and (c) in FIG. 13. In (b) in FIG. 13, the eNB transmits downlink data in a first OFDM symbol, and receives uplink data in fourth to seventh OFDM symbols and tenth to fourteenth OFDM symbols. Locations of second, third, eighth, and ninth OFDM symbols are reserved in advance for URLLC service downlink transmission. A difference between (b) and (c) in FIG. 13 lies in whether the third and ninth OFDM symbols are used for URLLC transmission because GPs in the two figures are different. When the GP has two OFDM symbols shown in (b) in FIG. 13, more resources may be provided for URLLC transmission.

For the downlink-dominate slot including seven OFDM symbols, as shown in (d) in FIG. 13, the eNB transmits downlink data in a first OFDM symbol and an eighth OFDM symbol, and receives uplink data in third to seventh OFDM symbols and tenth to fourteenth OFDM symbols. Locations of second and ninth OFDM symbols are reserved in advance for URLLC service downlink transmission. Locations of these reserved OFDM symbols may be specified in the standard or indicated by the eNB to URLLC UE.

In Embodiment 4 of the present invention, the eMBB service is not scheduled at a specific location in a subframe, thereby providing a transmission opportunity for URLLC. In addition, time-domain locations of URLLC uplink transmission and eMBB downlink transmission do not overlap, thereby avoiding mutual interference. In addition, an interval between two adjacent transmission opportunities of the URLLC uplink transmission does not exceed 0.5 ms, thereby meeting a URLLC latency requirement.

In addition, compared with Embodiment 2, in Embodiment 4 of the present invention, impact on the eMBB service is reduced, and spectrum efficiency is improved.

In Embodiment 1 to Embodiment 4 of the present invention, slot scheduling of idle OFDM symbols in various slot types in an intra-frequency mode is mainly implemented. The following describes a process of slot scheduling of idle OFDM symbols in various slot types in an adjacent-frequency mode.

Embodiment 5

It is assumed that a current slot for transmitting eMBB service data is a downlink-only slot, a downlink-dominate slot including 14 OFDM symbols, or a downlink-dominate slot including seven OFDM symbols, and an idle time of receive/transmit transition on an eNB side is defined as a receive/transmit transition idle time 624 Ts in the existing LTE standard.

An eNB determines an uplink resource time-domain location at which URLLC service data is transmitted. The uplink resource time-domain location at which the URLLC service data is transmitted may be predefined in the standard, or may uniquely correspond to a type of the current slot (the current slot is the downlink-only slot, the downlink-dominate slot including 14 OFDM symbols, or the downlink-dominate slot including seven OFDM symbols). In the downlink-only slot, an eMBB service is not performed in a seventh or fourteenth OFDM symbol. In the downlink-dominate slot including 14 OFDM symbols, if a number of an OFDM symbol at which eMBB uplink transmission starts is N, an eMBB service is not performed in an $(N-7)^{th}$ OFDM symbol.

For example, in this embodiment of the present invention, a sixth OFDM symbol or a thirteenth OFDM symbol is used as the uplink resource time-domain location at which the URLLC service data is transmitted.

The eNB determines the uplink resource time-domain location at which the URLLC service data is transmitted, and may indicate a slot type by signaling, and schedule eMBB downlink transmission and URLLC uplink transmission. The slot type indicated by the eNB includes a reserved idle OFDM symbol location. The signaling may be RRC signaling or downlink control signaling. In this embodiment of the present invention, same signaling may indicate a time-domain location at which eMBB downlink transmission is performed and a time-domain location at which URLLC uplink transmission is performed.

Optionally, in the downlink-dominate slot including 14 OFDM symbols, it is specified by the standard or notified by eNB signaling that a URLLC uplink resource is located at a time-domain location that is seven OFDM symbols previous to an OFDM symbol at which adjacent-frequency eMBB uplink transmission starts.

Figure 14:
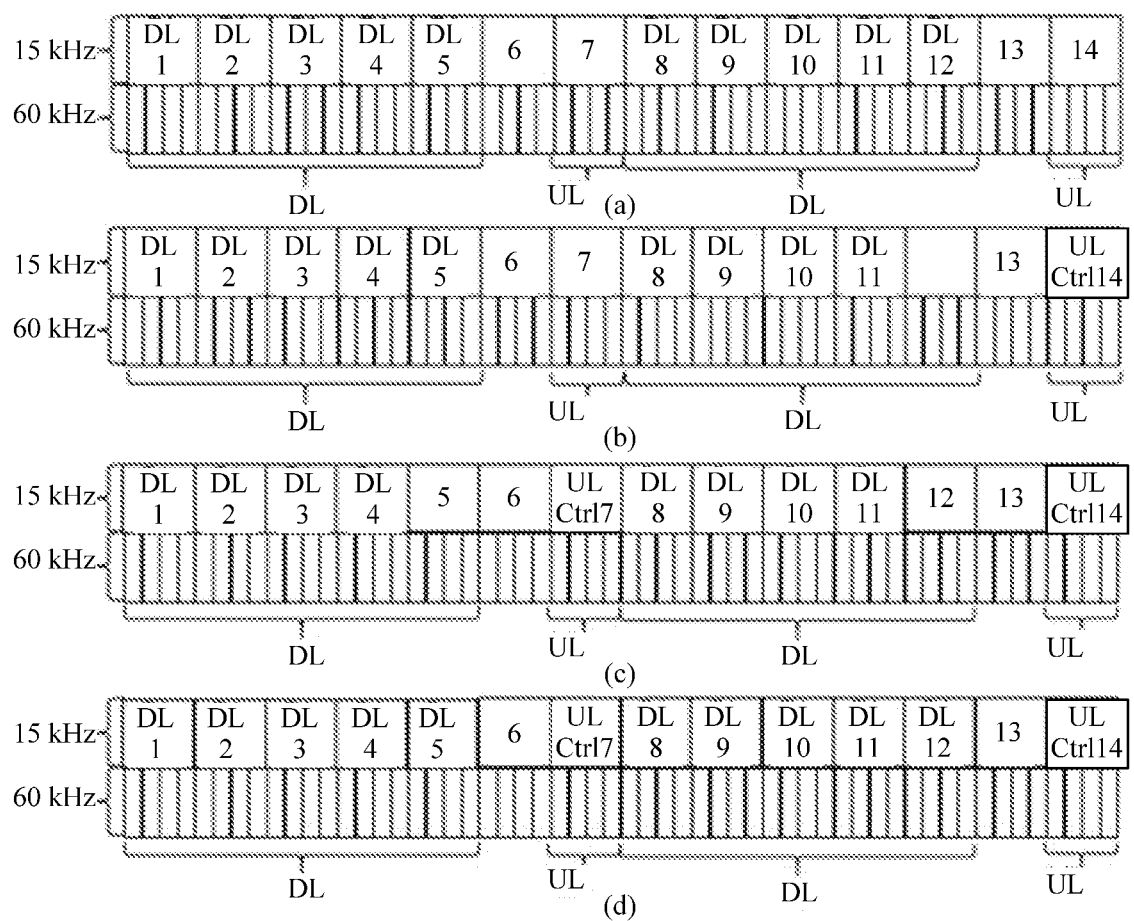
FIG. 14 is still another schematic diagram of number locations of OFDM symbols for scheduling eMBB downlink transmission and URLLC uplink transmission.

In this embodiment of the present invention, number locations of OFDM symbols for scheduling eMBB downlink transmission and URLLC uplink transmission are shown in FIG. 14.

For the downlink-only slot, as shown in (a) in FIG. 14, the eNB transmits downlink data in first to fifth OFDM symbols, and transmits downlink data in eighth to twelfth OFDM symbols. Locations of sixth, seventh, thirteenth, and fourteenth OFDM symbols are reserved in advance to avoid affecting adjacent-frequency URLLC uplink transmission. Numbers of the OFDM symbols reserved in advance may be specified in the standard or determined by using an end location at which the eNB schedules data. Optionally, in the sixth and seventh OFDM symbols that are in adjacent frequencies, one to five URLLC uplink OFDM symbols may be transmitted.

For the downlink-dominate slot including 14 OFDM symbols, as shown in (b) in FIG. 14, the eNB transmits downlink data in first to fifth OFDM symbols, transmits downlink data in eighth to eleventh OFDM symbols, and receives uplink data in a fourteenth OFDM symbol. Sixth and seventh OFDM symbols are reserved in advance for URLLC uplink transmission. In addition, twelfth and thirteenth OFDM symbols are a GP for the eMBB service. Because a GP required for the eMBB is greater than one OFDM symbol, and uplink transmission cannot be performed in the seventh OFDM symbol, the seventh OFDM symbol can only remain empty. Locations of OFDM symbols that may be reserved may be specified in the standard or indicated by the eNB to URLLC UE.

For the downlink-dominate slot including seven OFDM symbols, as shown in (c) and (d) in FIG. 14, if two frequency bands are scheduled by a same eNB, when slot type signaling is broadcast, same signaling may be broadcast. The signaling is a setting for a 15 kHz subcarrier spacing, and is another setting for a 60 kHz subcarrier spacing, as shown in (c) and (d) in FIG. 14.

In Embodiment 5 of the present invention, the eMBB service is not scheduled at a specific location in a subframe, thereby providing a transmission opportunity for URLLC. In addition, time-domain locations of the URLLC uplink transmission and the eMBB transmission do not overlap, thereby avoiding mutual interference. In addition, an interval between two adjacent transmission opportunities of the URLLC uplink transmission does not exceed 0.5 ms, thereby meeting a URLLC latency requirement. In addition, in Embodiment 5 of the present invention, the eMBB service is not scheduled at the specific location in the subframe, thereby providing a transmission opportunity for the adjacent-frequency URLLC.

Embodiment 6

It is assumed that a current slot for transmitting eMBB service data is an uplink-only slot, an uplink-dominate slot including 14 OFDM symbols, or an uplink-dominate slot including seven OFDM symbols, and an idle time of receive/transmit transition on an eNB side is defined as a receive/transmit transition idle time 624 Ts in the existing LTE standard.

An eNB determines a downlink resource time-domain location at which URLLC service data is transmitted. The downlink resource time-domain location at which the URLLC service data is transmitted may be predefined in the standard, or may uniquely correspond to a type of the current slot (the current slot is the uplink-only slot, the uplink-dominate slot including 14 OFDM symbols, or the uplink-dominate slot including seven OFDM symbols). In the uplink-only slot, an eMBB service is not performed in a first OFDM symbol or an eighth OFDM symbol. In the uplink-dominate slot including 14 OFDM symbols, if a number of an OFDM symbol at which eMBB downlink transmission ends is N, an eMBB service is not performed in an $(N+7)^{th}$ OFDM symbol.

After determining the downlink resource time-domain location at which the URLLC service data is transmitted, the eNB may indicate a slot type by signaling, and schedule eMBB uplink transmission and URLLC downlink transmission. The slot type indicated by the eNB includes a reserved idle OFDM symbol location. The signaling may be RRC signaling or downlink control signaling. In this embodiment of the present invention, same signaling may indicate a time-domain location at which eMBB uplink transmission is performed and a time-domain location at which URLLC downlink transmission is performed.

Optionally, in the uplink-dominate slot including 14 OFDM symbols, it is specified by the standard or notified by eNB signaling that a URLLC downlink resource is located at a time-domain location that is seven OFDM symbols subsequent to an OFDM symbol at which adjacent-frequency eMBB downlink transmission ends.

Figure 15:
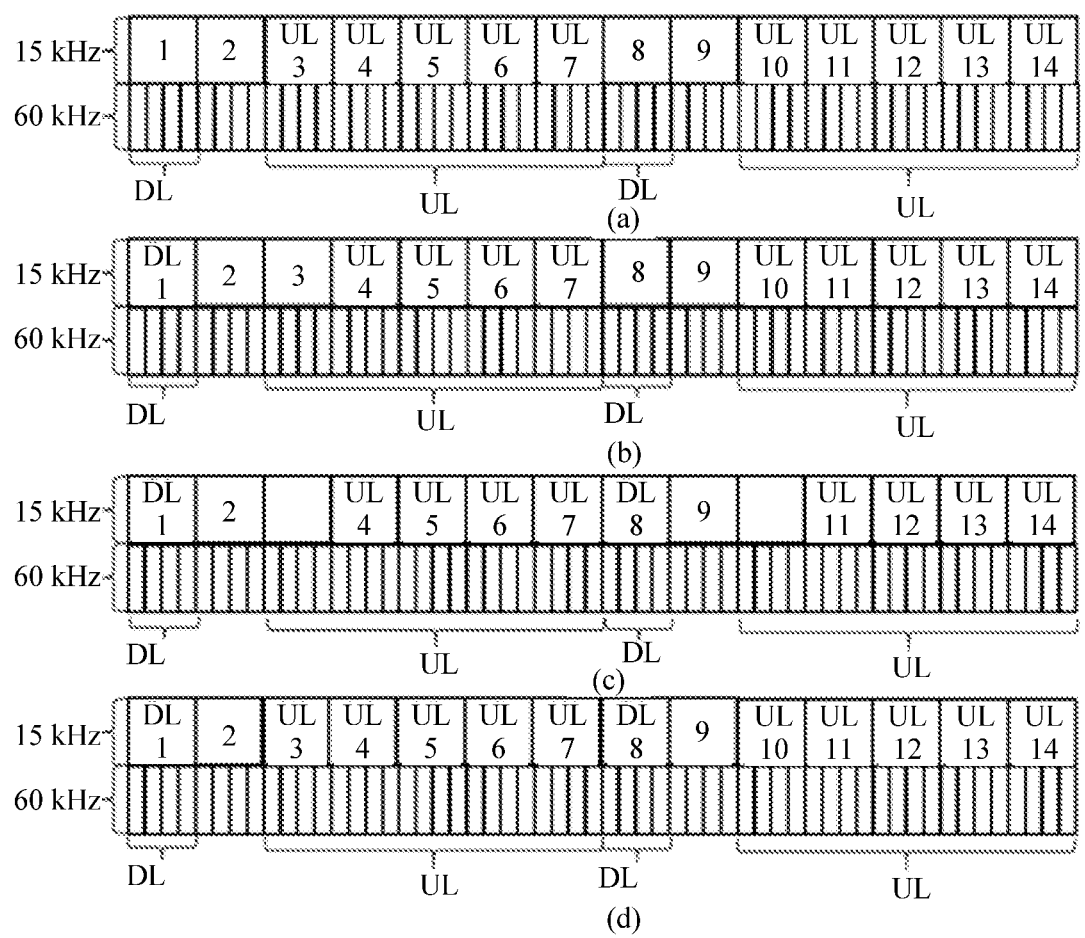
FIG. 15 is still another schematic diagram of number locations of OFDM symbols for scheduling eMBB uplink transmission and URLLC downlink transmission.

In this embodiment of the present invention, number locations of OFDM symbols for scheduling eMBB uplink transmission and URLLC downlink transmission are shown in FIG. 15.

For the uplink-only slot, as shown in (a) in FIG. 15, the eNB receives uplink data in third to seventh OFDM symbols and tenth to fourteenth OFDM symbols. Locations of first, second, eighth, and ninth OFDM symbols are reserved in advance to avoid affecting adjacent-frequency URLLC downlink transmission. Numbers of the OFDM symbols reserved in advance may be specified in the standard or determined by using a start location and an end location at which the eNB schedules data. Optionally, in the first and second OFDM symbols that are in adjacent frequencies, one to five URLLC downlink OFDM symbols may be transmitted.

For the uplink-dominate slot including 14 OFDM symbols, as shown in (b) in FIG. 15, the eNB receives uplink data in fourth to seventh OFDM symbols and tenth to fourteenth OFDM symbols, and transmits downlink data in a first OFDM symbol. Locations of eighth and ninth OFDM symbols are reserved in advance to avoid affecting adjacent-frequency URLLC downlink transmission. In addition, second and third OFDM symbols are a GP for the eMBB service. Because a GP required for the eMBB is greater than one OFDM symbol, and downlink transmission cannot be performed in the eighth and ninth OFDM symbols, the eighth and ninth OFDM symbols can only remain empty. When duration of the GP is greater than one OFDM symbol, an OFDM symbol in the GP may be reserved for the URLLC uplink transmission, and a location of the OFDM symbol reserved in the GP may be specified in the standard or indicated by the eNB to URLLC UE.

For the uplink-dominate slot including seven OFDM symbols, as shown in (c) and (d) in FIG. 15, if two frequency bands are scheduled by a same eNB, when slot type signaling is broadcast, same signaling may be broadcast. The signaling is a setting for a 15 kHz subcarrier spacing, and is another setting for a 60 kHz subcarrier spacing.

In Embodiment 6 of the present invention, the eMBB service is not scheduled at a specific location in a subframe, thereby providing a transmission opportunity for URLLC. In addition, time-domain locations of the URLLC uplink transmission and the eMBB transmission do not overlap, thereby avoiding mutual interference. In addition, an interval between two adjacent transmission opportunities of the URLLC uplink transmission does not exceed 0.5 ms, thereby meeting a URLLC latency requirement. In addition, in Embodiment 6 of the present invention, the eMBB service is not scheduled at the specific location in the subframe, thereby providing a transmission opportunity for the adjacent-frequency URLLC.

Embodiment 7

It is assumed that a current slot for transmitting eMBB service data is a downlink-only slot, a downlink-dominate slot including 14 OFDM symbols, or a downlink-dominate slot including seven OFDM symbols, and an idle time of receive/transmit transition on an eNB side is defined as a receive/transmit transition idle time less than or equal to 548 Ts in the existing LTE standard. It should be noted that, when a receive/transmit transition time is reduced to 548 Ts or less, a quantity of idle OFDM symbols reserved for eMBB downlink transmission is reduced, thereby improving eMBB transmission efficiency.

An eNB determines an uplink resource time-domain location at which URLLC service data is transmitted. The uplink resource time-domain location at which the URLLC service data is transmitted may be predefined in the standard, or may uniquely correspond to a type of the current slot (the current slot is the downlink-only slot, the downlink-dominate slot including 14 OFDM symbols, or the downlink-dominate slot including seven OFDM symbols). In the downlink-only slot, an eMBB service is not performed in a seventh or fourteenth OFDM symbol. In the downlink-dominate slot including 14 OFDM symbols, if a number of an OFDM symbol at which eMBB uplink transmission starts is N, an eMBB service is not performed in an $(N-7)^{th}$ OFDM symbol.

The eNB determines the uplink resource time-domain location at which the URLLC service data is transmitted, and may indicate a slot type by signaling, and schedule eMBB downlink transmission and URLLC uplink transmission. The slot type indicated by the eNB includes a reserved idle OFDM symbol location. The signaling may be RRC signaling or downlink control signaling. In this embodiment of the present invention, same signaling may indicate a time-domain location at which eMBB downlink transmission is performed and a time-domain location at which URLLC uplink transmission is performed.

Optionally, in the downlink-dominate slot including 14 OFDM symbols, it is specified by the standard or notified by eNB signaling that a URLLC uplink resource is located at a time-domain location that is seven OFDM symbols previous to an OFDM symbol at which adjacent-frequency eMBB uplink transmission starts.

Figure 16:
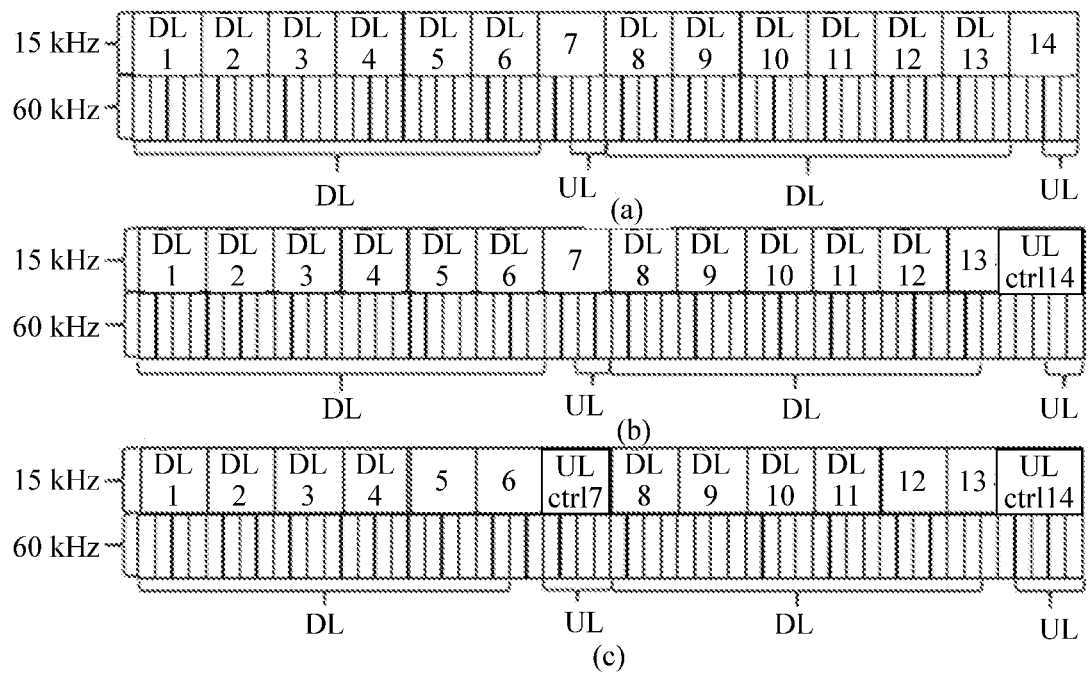
FIG. 16 is yet another schematic diagram of number locations of OFDM symbols for scheduling eMBB downlink transmission and URLLC uplink transmission.

In this embodiment of the present invention, number locations of OFDM symbols for scheduling eMBB downlink transmission and URLLC uplink transmission are shown in FIG. 16.

For the downlink-only slot, as shown in (a) in FIG. 16, the eNB transmits downlink data in first to sixth OFDM symbols, and transmits downlink data in eighth to thirteenth OFDM symbols. Locations of seventh and fourteenth OFDM symbols are reserved in advance to avoid affecting adjacent-frequency URLLC uplink transmission. Numbers of the OFDM symbols reserved in advance may be specified in the standard or determined by using an end location at which the eNB schedules data. Optionally, on adjacent frequencies corresponding to the seventh OFDM symbol and fourteenth OFDM symbol, one or two URLLC uplink OFDM symbols may be transmitted.

For the downlink-dominate slot including 14 OFDM symbols, as shown in (b) in FIG. 16, the eNB transmits downlink data in first to sixth OFDM symbols, transmits downlink data in eighth to twelfth OFDM symbols, and receives uplink data in a fourteenth OFDM symbol. A seventh OFDM symbol is reserved in advance for URLLC uplink transmission. In addition, a thirteenth OFDM symbol is a GP for the eMBB service. A location of the reserved OFDM symbol may be specified in the standard or indicated by the eNB to URLLC UE.

For the downlink-dominate slot including seven OFDM symbols, as shown in (c) in FIG. 16, if two frequency bands are scheduled by a same eNB, when slot type signaling is broadcast, same signaling may be broadcast. The signaling is a setting for a 15 kHz subcarrier spacing, and is another setting for a 60 kHz subcarrier spacing.

In Embodiment 7 of the present invention, the eMBB service is not scheduled at a specific location in a subframe, thereby providing a transmission opportunity for URLLC. In addition, time-domain locations of the URLLC uplink transmission and the eMBB downlink transmission do not overlap, thereby avoiding mutual interference. In addition, an interval between two adjacent transmission opportunities of the URLLC uplink transmission does not exceed 0.5 ms, thereby meeting a URLLC latency requirement. Further, in Embodiment 7 of the present invention, impact on the eMBB service is reduced, and spectrum efficiency is improved.

Embodiment 8

It is assumed that a current slot for transmitting eMBB service data is an uplink-only slot, an uplink-dominate slot including 14 OFDM symbols, or an uplink-dominate slot including seven OFDM symbols, and an idle time of receive/transmit transition on an eNB side is defined as a receive/transmit transition idle time less than or equal to 548 Ts in the existing LTE standard. It should be noted that, when a receive/transmit transition time is reduced to 548 Ts or less, a quantity of idle OFDM symbols reserved for eMBB downlink transmission is reduced, thereby improving eMBB transmission efficiency.

An eNB determines a downlink resource time-domain location at which URLLC service data is transmitted. The downlink resource time-domain location at which the URLLC service data is transmitted may be predefined in the standard, or may uniquely correspond to a type of the current slot (the current slot is the uplink-only slot, the uplink-dominate slot including 14 OFDM symbols, or the uplink-dominate slot including seven OFDM symbols). In the uplink-only slot, an eMBB service is not performed in a first OFDM symbol or an eighth OFDM symbol. In the uplink-dominate slot including 14 OFDM symbols, if a number of an OFDM symbol at which eMBB downlink transmission ends is N, an eMBB service is not performed in an $(N+7)^{th}$ OFDM symbol.

After determining the downlink resource time-domain location at which the URLLC service data is transmitted, the eNB may indicate a slot type by signaling, and schedule eMBB uplink transmission and URLLC downlink transmission. The slot type indicated by the eNB includes a reserved idle OFDM symbol location. The signaling may be RRC signaling or downlink control signaling. In this embodiment of the present invention, same signaling may indicate a time-domain location at which eMBB uplink transmission is performed and a time-domain location at which URLLC downlink transmission is performed.

Optionally, in the uplink-dominate slot including 14 OFDM symbols, it is specified by the standard or notified by eNB signaling that a URLLC downlink resource is located at a time-domain location that is seven OFDM symbols subsequent to an OFDM symbol at which adjacent-frequency eMBB downlink transmission ends.

Figure 17:
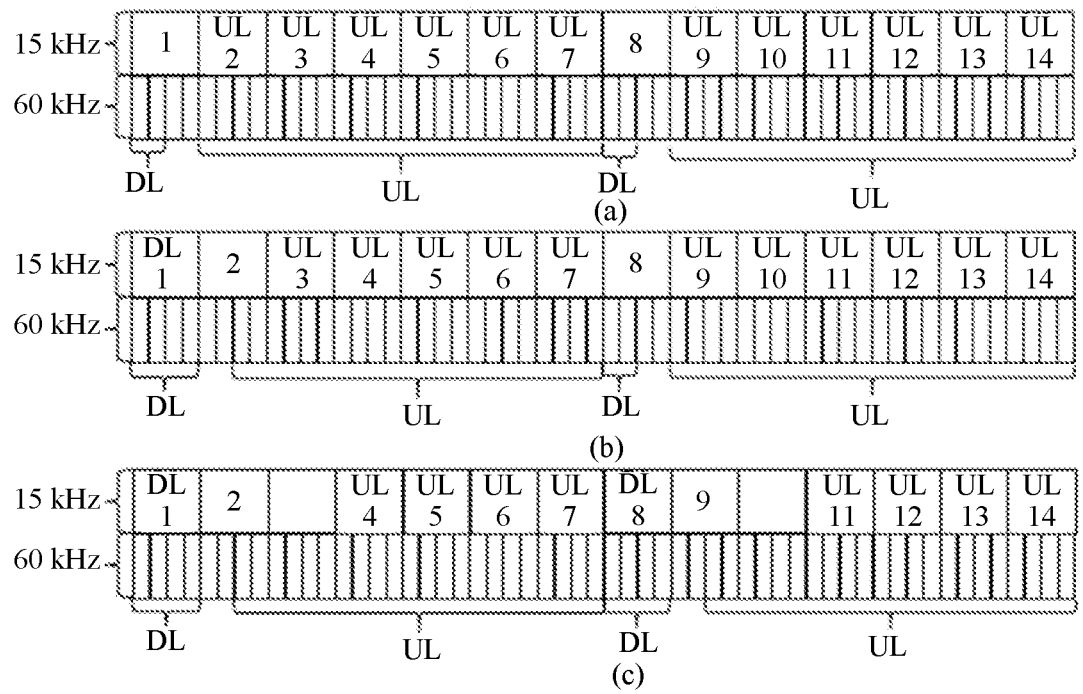
FIG. 17 is yet another schematic diagram of number locations of OFDM symbols for scheduling eMBB uplink transmission and URLLC downlink transmission.

In this embodiment of the present invention, number locations of OFDM symbols for scheduling eMBB uplink transmission and URLLC downlink transmission are shown in FIG. 17.

For the uplink-only slot, as shown in (a) in FIG. 17, the eNB receives uplink data in second to seventh OFDM symbols and ninth to fourteenth OFDM symbols. Locations of first and eighth OFDM symbols are reserved in advance to avoid affecting adjacent-frequency URLLC downlink transmission. Locations of the OFDM symbols reserved in advance may be specified in the standard or determined by using a start location and an end location at which the eNB schedules data. Optionally, in the first and eighth OFDM symbols that are in adjacent frequencies, one or two URLLC downlink OFDM symbols may be transmitted.

For the uplink-dominate slot including 14 OFDM symbols, as shown in (b) in FIG. 17, the eNB receives uplink data in third to seventh OFDM symbols and ninth to fourteenth OFDM symbols, and sends downlink data in a first OFDM symbol. A location of an eighth OFDM symbol is reserved in advance to avoid affecting adjacent-frequency URLLC downlink transmission. In addition, a second OFDM symbol is a GP for the eMBB service. A location of the reserved OFDM symbol may be specified in the standard or indicated by the eNB to URLLC UE.

For the uplink-dominate slot including seven OFDM symbols, as shown in (c) in FIG. 17, if two frequency bands are scheduled by a same eNB, when slot type signaling is broadcast, same signaling may be broadcast. The signaling is a setting for a 15 kHz subcarrier spacing, and is another setting for a 60 kHz subcarrier spacing.

In Embodiment 8 of the present invention, the eMBB service is not scheduled at a specific location in a subframe, thereby providing a transmission opportunity for URLLC. In addition, time-domain locations of the URLLC uplink transmission and the eMBB downlink transmission do not overlap, thereby avoiding mutual interference. In addition, an interval between two adjacent transmission opportunities of the URLLC uplink transmission does not exceed 0.5 ms, thereby meeting a URLLC latency requirement.

Compared with Embodiment 6, in Embodiment 8 of the present invention, impact on the eMBB service is reduced, and spectrum efficiency is improved.

In the embodiments of the present invention, spatial multiplexing opportunities are increased by using the foregoing slot scheduling solutions in which an idle time is reserved. Therefore, system spectrum efficiency can be improved, and various services that have different requirements can be supported.

Based on the slot scheduling method in the foregoing embodiments, an embodiment of the present invention further provides a slot scheduling apparatus. It can be understood that, to implement the foregoing functions, the slot scheduling apparatus includes a corresponding hardware structure and/or software module for performing the functions. The embodiments of the present invention can be implemented in a form of hardware or in a form of a combination of hardware and computer software with reference to units and algorithm steps of examples described in the embodiments disclosed in the present invention. Whether a function is performed by hardware or by computer software driving hardware depends on specific applications and design constraints of the technical solutions. A person skilled in the art may use different methods to implement the described functions for each particular application, but it should not be considered that the implementation goes beyond the scope of the technical solutions of the embodiments of the present invention.

Functional unit division may be performed on the slot scheduling apparatus based on the foregoing method examples in the embodiments of the present invention. For example, the functional units may be obtained through division based on the functions, or two or more functions may be integrated into one processing unit. The foregoing integrated unit may be implemented in a form of hardware, or may be implemented in a form of a software functional unit. It should be noted that the unit division in the embodiments of the present invention is an example, and is merely logical function division and may be other division during actual implementation.

Figure 18:
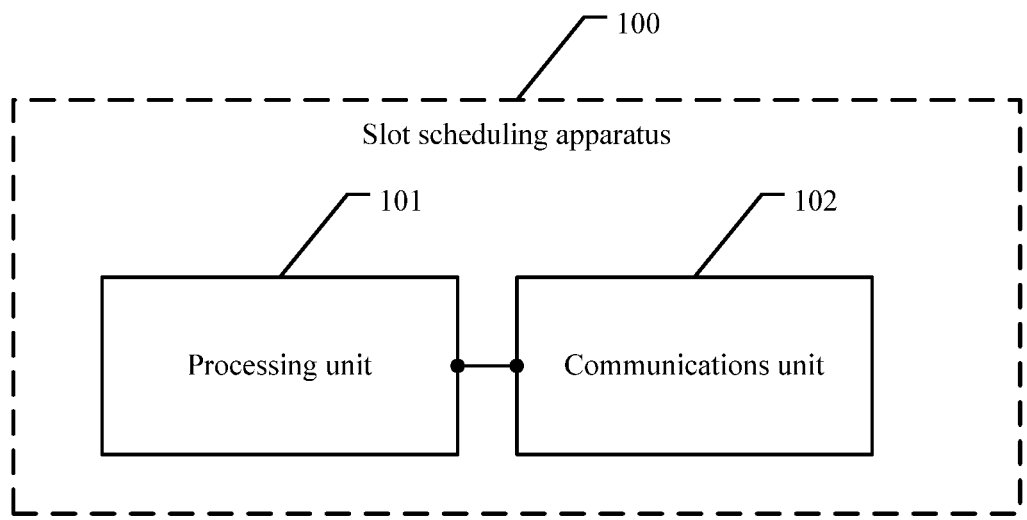
FIG. 18 is a schematic structural diagram of a slot scheduling apparatus according to an embodiment of the present invention.

In a case of using an integrated unit, FIG. 18 is a schematic structural diagram of a slot scheduling apparatus according to an embodiment of the present invention. Referring to FIG. 18, the slot scheduling apparatus 100 includes a processing unit 101 and a communications unit 102. The processing unit 101 is configured to determine a slot of any structure in the foregoing method embodiments. The communications unit 102 is configured to send the slot determined by the processing unit 101.

In this embodiment of the present invention, functions of the processing unit 101 and the communications unit 102 may correspond to the functions in the foregoing method embodiments, and certainly, are not limited to the functions described above. For example, the processing unit 101 may process data carried in the slot based on configuration information of the slot. The communications unit 102 may be configured to obtain slot configuration information of a current frequency band based on a communication direction of data transmission in an adjacent frequency band.

When a form of hardware is used for implementation, in this embodiment of the present invention, the processing unit 101 may be a processor, and the communications unit 102 may be a communications interface, a receiver, a transmitter, a transceiver circuit, or the like. The communications interface is a collective name and may include one or more interfaces.

Figure 19:
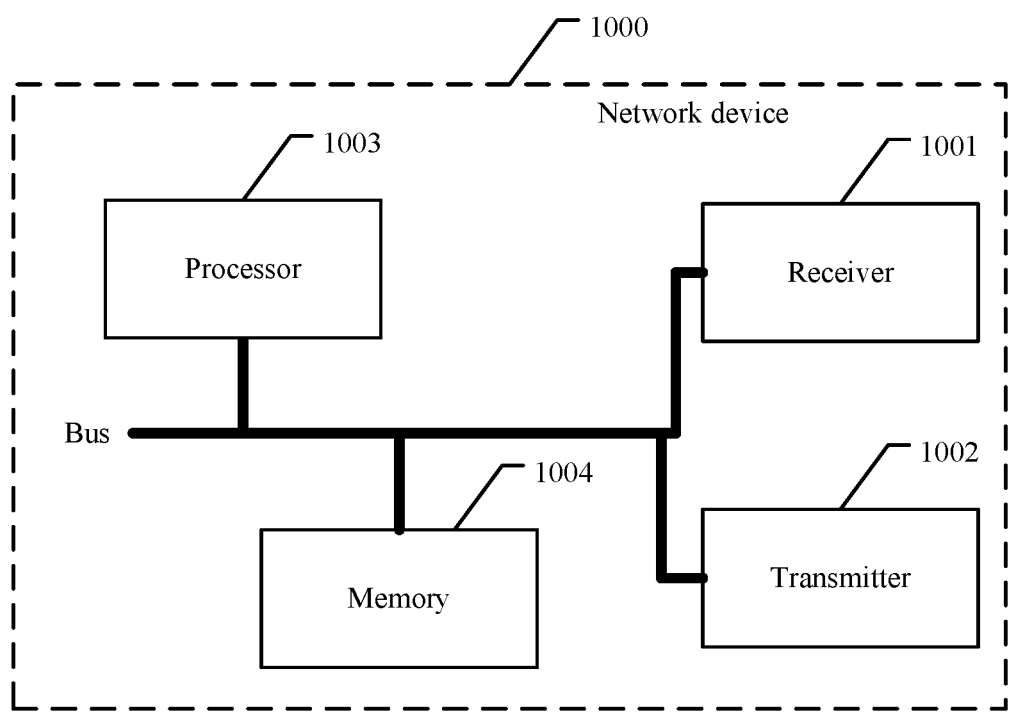
FIG. 19 is a schematic structural diagram of a network device according to an embodiment of the present invention.

When the processing unit 101 is a processor and the communications unit 102 includes a receiver and a transmitter, the slot scheduling apparatus 100 in this embodiment of the present invention may be a network device shown in FIG. 19. The network device shown in FIG. 9 may be an eNB.

FIG. 19 is a schematic structural diagram of a network device 1000 according to an embodiment of the present invention. Referring to FIG. 19, the network device 1000 includes a receiver 1001, a transmitter 1002, a processor 1003, and a memory 1004. The receiver 1001, the transmitter 1002, the processor 1003, and the memory 1004 may be connected through a bus or in another manner. In FIG. 19, a bus connection is used as an example.

The memory 1004 may include a read-only memory and a random access memory, and provide an instruction and data for the processor 1003. A part of the memory 1004 may further include a non-volatile random access memory (Non-Volatile Random Access Memory, NVRAM). The memory 1004 stores an operating system and operating instructions, and an executable module or a data structure, or a subset or an extended set thereof. The operating instructions may include various operating instructions and are used to implement various operations. The operating system may include various system programs, which are used to implement various basic services and process a hardware-based task.

The processor 1003 is configured to implement the foregoing functions of slot scheduling and slot configuration. The processor 1003 may also be referred to as a central processing unit (Central Processing Unit, CPU). In a specific application, all components are coupled together through a bus system. The bus system includes a power supply bus, a control bus, a status signal bus, and the like, in addition to a data bus. However, for clear description, various types of buses in the figure are referred to as the bus system.

The method disclosed in the foregoing embodiments of the present invention may be applied to the processor 1003, or implemented by the processor 1003. The processor 1003 may be an integrated circuit chip and has a signal processing capability. In an implementation process, steps in the foregoing methods may be implemented by using a hardware integrated logic circuit in the processor 1003, or by using instructions in a form of software. The foregoing processor 1003 may be a general-purpose processor, a digital signal processor (digital signal processing, DSP), an application-specific integrated circuit (Application-Specific Integrated Circuit, ASIC), a field programmable gate array (Field Programmable Gate Array, FPGA) or another programmable logic device, a discrete gate or transistor logic device, or a discrete hardware component. The processor may implement or perform the methods, the steps, and logical block diagrams that are disclosed in the embodiments of the present invention. The general-purpose processor may be a microprocessor, or the processor may be any conventional processor or the like. Steps of the methods disclosed with reference to the embodiments of the present invention may be directly executed and completed by a hardware decoding processor, or may be executed and completed by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory 1004, and the processor 1003 reads information in the memory 1004 and completes the steps in the foregoing methods in combination with hardware of the processor.

In this embodiment of the present invention, the processor 1003 is configured to perform the slot scheduling method in the foregoing embodiments and configure a slot structure. The configured slot structure may be stored in the memory 1004. For details, refer to an implementation process of slot structure configuration and scheduling in the foregoing embodiments. Details are not described herein again.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected based on actual needs to achieve the objectives of the solutions of the embodiments. In addition, in the accompanying drawings of the apparatus embodiments provided in the present invention, connection relationships between modules indicate that the modules have communication connections with each other, which may be specifically implemented as one or more communications buses or signal cables. A person of ordinary skill in the art may understand and implement the embodiments of the present invention without creative efforts.

Further, it should be noted that the terms used in the embodiments of the present invention are merely for the purpose of illustrating specific embodiments, and are not intended to limit the present invention. The terms "a" and "the" of singular forms used in the embodiments and the appended claims of the present invention are also intended to include plural forms, unless otherwise specified in the context clearly. It should also be understood that, the term "and/or" used in the specification indicates and includes any or all possible combinations of one or more associated listed items. In addition, the character "/" in the specification generally represents an "or" relationship between the associated objects.

It should be understood that the terms "first", "second", and the like may be used in the embodiments of the present invention to distinguish between similar objects, but do not necessarily indicate a specific order or sequence. For example, the first idle time and the second idle time in the embodiments of the present invention are merely used for ease of description and distinguishing between different idle times, but do not constitute a limitation on an idle time. It should be understood that the data used in such a way are interchangeable in proper circumstances, so that the embodiments of the present invention described herein can be implemented in other orders than the order illustrated or described herein.

Depending on the context, for example, words "if" used herein may be explained as "while" or "when" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

A person of ordinary skill in the art may understand that all or some of the steps in the foregoing method of the embodiments may be implemented by a program instructing a processor. The program may be stored in a computer readable storage medium. The storage medium is a non-transitory (English: non-transitory) medium, such as a random-access memory, a read-only memory, a flash memory, a hard disk, a solid state drive, a magnetic tape (English: magnetic tape), a floppy disk (English: floppy disk), an optical disc (English: optical disc), or any combination thereof.

The present invention is described with reference to respective flowcharts and block diagrams of methods and devices in the embodiments of the present invention. It should be understood that computer program instructions may be used to implement each process and each block in the flowcharts and the block diagrams and a combination of a process and a block in the flowcharts and the block diagrams. These computer program instructions may be provided for a general-purpose computer, a special-purpose computer, an embedded processor, or a processor of another programmable data processing device to generate a machine, so that the instructions executed by the computer or the processor of the another programmable data processing device generate an apparatus for implementing a specific function in one or more processes in the flowcharts or in one or more blocks in the block diagrams.

The foregoing descriptions are merely example implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A slot type indication method carried out by an apparatus, comprising:
   receiving indication information sent by a network device, wherein the indication information indicates at least one slot type of a first slot, the first slot corresponds to a first subcarrier spacing, and wherein:
   according to the at least one slot type of the first slot, the first slot comprises a plurality of orthogonal frequency division multiplexing (OFDM) symbols, the plurality of OFDM symbols are allocated to be used for uplink transmission, downlink transmission, or reservation, and a quantity of OFDM symbols of the plurality of OFDM symbols is an even number, and
   according to the at least one slot type of the first slot, a first half of the plurality of OFDM symbols comprised in the first slot comprises at least one OFDM symbol allocated to be used for downlink transmission and at least one OFDM symbol allocated to be used for uplink transmission, and a remaining half of the plurality of OFDM symbols in the first slot comprises at least one OFDM symbol allocated to be used for downlink transmission and at least one OFDM symbol allocated to be used for uplink transmission; and
   determining, based on the indication information, a slot type of a second slot, wherein the second slot corresponds to a second subcarrier spacing, the second subcarrier spacing is K times the first subcarrier spacing, and K is an integer greater than 1.

2. The method according to claim 1, wherein according to the at least one slot type of the first slot, the first slot comprises 14 OFDM symbols, and the 14 OFDM symbols comprise:
   a first OFDM symbol and an eighth OFDM symbol that are allocated to be used for downlink transmission, and a seventh OFDM symbol and a fourteenth OFDM symbol that are allocated to be used for uplink transmission.

3. The method according to claim 1, wherein according to the at least one slot type of the first slot, the first slot comprises 14 OFDM symbols, and the 14 OFDM symbols comprise:
   a first OFDM symbol and an eighth OFDM symbol that are allocated to be used for downlink transmission;
   a fourth OFDM symbol to a seventh OFDM symbol and an eleventh OFDM symbol to a fourteenth OFDM symbol that are allocated to be used for uplink transmission; and
   second, third, ninth, and tenth OFDM symbols that are allocated to be used for reservation.

4. The method according to claim 1, wherein according to the at least one slot type of the first slot, the first slot comprises 14 OFDM symbols, and the 14 OFDM symbols comprise:
   a first OFDM symbol and an eighth OFDM symbol that are allocated to be used for downlink transmission;
   a third OFDM symbol to a seventh OFDM symbol and a tenth OFDM symbol to a fourteenth OFDM symbol that are allocated to be used for uplink transmission; and
   a second OFDM symbol and a ninth OFDM symbol that are allocated to be used for reservation.

5. The method according to claim 1, wherein according to the at least one slot type of the first slot, the first slot comprises 14 OFDM symbols, and the 14 OFDM symbols comprise:
   a first OFDM symbol to a fourth OFDM symbol and an eighth OFDM symbol to an eleventh OFDM symbol that are allocated to be used for downlink transmission;
   a seventh OFDM symbol and a fourteenth OFDM symbol that are allocated to be used for uplink transmission; and
   a fifth OFDM symbol, a sixth OFDM symbol, a twelfth OFDM symbol, and a thirteenth OFDM symbol that are allocated to be used for reservation.

6. The method according to claim 5, wherein that a seventh OFDM symbol and a fourteenth OFDM symbol are allocated to be used for uplink transmission comprises:
   the seventh OFDM symbol and the fourteenth OFDM symbol are allocated to be used for the uplink transmission to transmit acknowledgement information or negative acknowledgement information, or to transmit uplink channel state information.

7. The method according to claim 2, wherein according to the at least one slot type of the first slot, the first slot comprises 14 OFDM symbols, and the 14 OFDM symbols comprise:
   a first OFDM symbol to a fifth OFDM symbol and an eighth OFDM symbol to a twelfth OFDM symbol that are allocated to be used for downlink transmission;
   a seventh OFDM symbol and a fourteenth OFDM symbol that are allocated to be used for uplink transmission; and
   a sixth OFDM symbol and a thirteenth OFDM symbol that are allocated to be used for reservation.

8. The method according to claim 7, wherein that a seventh OFDM symbol and a fourteenth OFDM symbol are allocated to be used for uplink transmission comprises:
   the seventh OFDM symbol and the fourteenth OFDM symbol are allocated to be used for the uplink transmission to transmit acknowledgement information or negative acknowledgement information, or to transmit uplink channel state information.

9. An apparatus comprising:
   a processor and a memory, wherein the memory is configured to store one or more instructions, and when the processor executes the one or more instructions, the apparatus is caused to:
   receive indication information sent from a network device, wherein the indication information indicates at least one slot type of a first slot, the first slot corresponds to a first subcarrier spacing, and wherein:
   according to the at least one slot type of the first slot, the first slot comprises a plurality of orthogonal frequency division multiplexing (OFDM) symbols, and the plurality of OFDM symbols are allocated to be used for uplink transmission, downlink transmission, or reservation, and a quantity of OFDM symbols of the plurality of OFDM symbols is an even number, and
   according to the at least one slot type of the first slot, a first half of the plurality of OFDM symbols comprises at least one OFDM symbol allocated to be used for downlink transmission and at least one OFDM symbol allocated to be used for uplink transmission, and a remaining half of the plurality of OFDM symbols comprises at least one OFDM symbol allocated to be used for downlink transmission and at least one OFDM symbol allocated to be used for uplink transmission; and determine, based on the indication information, a slot type of a second slot to use to transmit data, wherein the second slot corresponds to a second subcarrier spacing, the second subcarrier spacing is K times the first subcarrier spacing, and K is an integer greater than 1.

10. The apparatus according to claim 9, wherein according to the at least one slot type of the first slot, the first slot comprises 14 OFDM symbols, and the 14 OFDM symbols comprise:
a first OFDM symbol and an eighth OFDM symbol that are allocated to be used for downlink transmission, and a seventh OFDM symbol and a fourteenth OFDM symbol that are allocated to be used for uplink transmission.

11. The apparatus according to claim 9, wherein according to the at least one slot type of the first slot, the first slot comprises 14 OFDM symbols, and the 14 OFDM symbols comprise:
a first OFDM symbol and an eighth OFDM symbol that are allocated to be used for downlink transmission;
a fourth OFDM symbol to a seventh OFDM symbol and an eleventh OFDM symbol to a fourteenth OFDM symbol that are allocated to be used for uplink transmission; and
second, third, ninth, and tenth OFDM symbols that are allocated to be used for reservation.

12. The apparatus according to claim 9, wherein according to the at least one slot type of the first slot, the first slot comprises 14 OFDM symbols, and the 14 OFDM symbols comprise:
a first OFDM symbol and an eighth OFDM symbol that are allocated to be used for downlink transmission;
a third OFDM symbol to a seventh OFDM symbol and a tenth OFDM symbol to a fourteenth OFDM symbol that are allocated to be used for uplink transmission; and
a second OFDM symbol and a ninth OFDM symbol that are allocated to be used for reservation.

13. The apparatus according to claim 9, wherein according to the at least one slot type of the first slot, the first slot comprises 14 OFDM symbols, and the 14 OFDM symbols comprise:
a first OFDM symbol to a fourth OFDM symbol and an eighth OFDM symbol to an eleventh OFDM symbol that are allocated to be used for downlink transmission;
a seventh OFDM symbol and a fourteenth OFDM symbol that are allocated to be used for uplink transmission; and
a fifth OFDM symbol, a sixth OFDM symbol, a twelfth OFDM symbol, and a thirteenth OFDM symbol that are allocated to be used for reservation.

14. The apparatus according to claim 13, wherein that a seventh OFDM symbol and a fourteenth OFDM symbol are allocated to be used for uplink transmission comprises:
the seventh OFDM symbol and the fourteenth OFDM symbol are allocated to be used for the uplink transmission to transmit acknowledgement information or negative acknowledgement information, or to transmit uplink channel state information.

15. The apparatus according to claim 9, wherein according to the at least one slot type of the first slot, the first slot comprises 14 OFDM symbols, and the 14 OFDM symbols comprise:
a first OFDM symbol to a fifth OFDM symbol and an eighth OFDM symbol to a twelfth OFDM symbol that are allocated to be used for downlink transmission;
a seventh OFDM symbol and a fourteenth OFDM symbol that are allocated to be used for uplink transmission; and
a sixth OFDM symbol and a thirteenth OFDM symbol that are allocated to be used for reservation.

16. The apparatus according to claim 15, wherein that a seventh OFDM symbol and a fourteenth OFDM symbol are allocated to be used for uplink transmission comprises:
the seventh OFDM symbol and the fourteenth OFDM symbol are allocated to be used for the uplink transmission to transmit acknowledgement information or negative acknowledgement information, or to transmit uplink channel state information.

17. The apparatus according to claim 9, wherein an OFDM symbol length in the first slot is K times an OFDM symbol length in the second slot.

18. The apparatus according to claim 9, wherein a first OFDM symbol in the first slot is aligned with a first OFDM symbol in the second slot.

19. The apparatus according to claim 9, wherein the first subcarrier spacing is 15 kHZ, and the second subcarrier spacing is 30 kHZ or 60 kHZ.

20. The apparatus according to claim 9, wherein in the second slot every L OFDM symbols of the second slot have a same allocation of downlink, uplink, or reserved as a corresponding one OFDM symbol of the first slot, and L is an integer having a same value as K.

21. The apparatus according to claim 9, wherein a structure of the first half of the plurality of OFDM symbols in the first slot is the same as a structure of the remaining half of the plurality of OFDM symbols in the first slot.

22. The apparatus according to claim 9, wherein when the processor executes the one or more instructions, the apparatus is caused to:
send an uplink transmission or receive a downlink transmission based on the second slot.

23. A non-transitory computer-readable storage medium comprising instructions which, when executed by a computer, cause the computer to carry out the steps of the method of claim 1.

* * * * *

UNITED STATES PATENT AND TRADEMARK OFFICE
CERTIFICATE OF CORRECTION

PATENT NO. : 11,343,814 B2
APPLICATION NO. : 16/347419
DATED : May 24, 2022
INVENTOR(S) : Yun Liu

It is certified that error appears in the above-identified patent and that said Letters Patent is hereby corrected as shown below:

In the Claims

Claim 7, Column 32, Line 24; delete "2" and insert --1--.

Signed and Sealed this
Fifth Day of July, 2022

Katherine Kelly Vidal
*Director of the United States Patent and Trademark Office*